US011696150B2

(12) United States Patent
Brisebois et al.

(10) Patent No.: US 11,696,150 B2
(45) Date of Patent: *Jul. 4, 2023

(54) NETWORK PLANNING BASED ON CROWD-SOURCED ACCESS POINT DATA FOR 5G OR OTHER NEXT GENERATION NETWORK

(71) Applicants: AT&T Intellectual Property I, L.P., Atlanta, GA (US); AT&T Mobility II LLC, Atlanta, GA (US)

(72) Inventors: Arthur Richard Brisebois, Cumming, GA (US); Jeffrey Mikan, Atlanta, GA (US); Kurt Huber, Kennesaw, GA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,235

(22) Filed: May 13, 2022

(65) Prior Publication Data
US 2022/0272546 A1    Aug. 25, 2022

Related U.S. Application Data

(63) Continuation of application No. 16/860,580, filed on Apr. 28, 2020, now Pat. No. 11,375,382, which is a
(Continued)

(51) Int. Cl.
*H04W 40/00*    (2009.01)
*H04W 16/18*    (2009.01)
(Continued)

(52) U.S. Cl.
CPC ......... *H04W 16/18* (2013.01); *H04J 11/0023* (2013.01); *H04L 41/082* (2013.01);
(Continued)

(58) Field of Classification Search
CPC ... H04W 16/18; H04W 16/04; H04J 11/0023; H04L 41/082; H04L 41/0853; H04L 41/14; H04L 43/087; H04L 43/16
See application file for complete search history.

(56) References Cited

U.S. PATENT DOCUMENTS 7,447,176 B2    11/2008  Ruan et al.
7,509,131 B2     3/2009  Krumm et al.
(Continued)

FOREIGN PATENT DOCUMENTS

CN    104579854 A    4/2015
EP    2 663 120 A2   11/2013
(Continued)

OTHER PUBLICATIONS

Kvalbein et al., "The Nornet Edge Platform for Mobile Broadband Measurements," Computer Networks, 2014, pp. 88-101, vol. 61, Elsevier, 14 pages.
(Continued)

*Primary Examiner* — Justin Y Lee
(74) *Attorney, Agent, or Firm* — Amin, Turocy & Watson, LLP

(57) ABSTRACT

Network planning based on collected crowd-sourced access point quality and selection data can optimize access point frequency and/or bandwidth selection. A cloud-based application can be utilized in conjunction with a mobile device to build a database of access point quality and thresholds suitable for real-time and other jitter-sensitive services. The mobile device jitter measurements and selection thresholds can be collected at a cloud platform, which creates an access
(Continued)

point performance and selection threshold profile from which the network can facilitate access point frequency and/or bandwidth selections.

20 Claims, 30 Drawing Sheets

Related U.S. Application Data continuation of application No. 16/251,404, filed on Jan. 18, 2019, now Pat. No. 10,674,372, which is a continuation of application No. 15/721,308, filed on Sep. 29, 2017, now Pat. No. 10,231,134.

(51) Int. Cl.

| | | |
|---|---|---|
| H04L 41/14 | (2022.01) | |
| H04W 16/04 | (2009.01) | |
| H04L 41/0853 | (2022.01) | |
| H04L 41/082 | (2022.01) | |
| H04L 43/16 | (2022.01) | |
| H04J 11/00 | (2006.01) | |
| H04L 43/087 | (2022.01) | |

(52) U.S. Cl.
CPC ......... *H04L 41/0853* (2013.01); *H04L 41/14* (2013.01); *H04L 43/087* (2013.01); *H04L 43/16* (2013.01); *H04W 16/04* (2013.01)

(56) References Cited

U.S. PATENT DOCUMENTS

| | | | |
|---|---|---|---|
| 8,000,276 B2 | 8/2011 | Scherzer et al. | |
| 8,116,285 B1 | 2/2012 | Bamum | |
| 8,262,151 B2 | 9/2012 | De Queiroz et al. | |
| 8,320,939 B1 | 11/2012 | Vincent | |
| 8,345,599 B2 | 1/2013 | Famolar et al. | |
| 8,374,632 B2 | 2/2013 | Ristich et al. | |
| 8,559,975 B2 | 10/2013 | Lin et al. | |
| 8,565,766 B2 | 10/2013 | Scherzer et al. | |
| 8,570,993 B2 | 10/2013 | Austin et al. | |
| 8,665,154 B2 | 3/2014 | Lin et al. | |
| 8,744,484 B2 | 6/2014 | Do et al. | |
| 8,885,565 B2 | 11/2014 | van de Ven et al. | |
| 8,892,118 B2 | 11/2014 | Garin et al. | |
| 9,084,122 B2 | 7/2015 | Gao et al. | |
| 9,113,432 B2 | 8/2015 | Teed-Gillen et al. | |
| 9,118,776 B2 | 8/2015 | Huang et al. | |
| 9,137,744 B2 | 9/2015 | Scherzer et al. | |
| 9,161,200 B2 | 10/2015 | Guday et al. | |
| 9,167,551 B2 | 10/2015 | Gao et al. | |
| 9,185,516 B2 | 11/2015 | Fischer et al. | |
| 9,185,644 B2 | 11/2015 | Mizutani | |
| 9,185,678 B2 | 11/2015 | Tzamaloukas | |
| 9,247,520 B2 | 1/2016 | Malik | |
| 9,338,592 B1 | 5/2016 | Mahapatra | |
| 9,338,740 B2 | 5/2016 | Guo et al. | |
| 9,401,086 B2 | 7/2016 | Basalamah | |
| 9,432,964 B2 | 8/2016 | Garin et al. | |
| 9,451,451 B2 | 9/2016 | Chow et al. | |
| 9,467,869 B2 | 10/2016 | Servais et al. | |
| 9,503,858 B2 | 11/2016 | Palanki et al. | |
| 9,507,747 B2 | 11/2016 | Lin et al. | |
| 9,516,582 B2 | 12/2016 | Akgul et al. | |
| 9,609,539 B2 | 3/2017 | Edge et al. | |
| 9,609,560 B2 | 3/2017 | Cootey | |
| 9,686,140 B2 | 6/2017 | Pacella et al. | |
| 9,727,881 B2 | 8/2017 | Roy et al. | |
| 9,888,475 B2 | 2/2018 | Wolcott et al. | |
| 10,231,134 B1* | 3/2019 | Brisebois | H04L 41/0853 |
| 10,674,372 B2* | 6/2020 | Brisebois | H04W 16/04 |
| 2005/0171720 A1 | 8/2005 | Olson et al. | |
| 2006/0268785 A1* | 11/2006 | Park | H04W 16/14 |
| | | | 370/331 |
| 2007/0066304 A1 | 3/2007 | Lee | |
| 2008/0117875 A1 | 5/2008 | Bennett et al. | |
| 2009/0122720 A1* | 5/2009 | Karacali-Akyamac | |
| | | | H04L 43/50 |
| | | | 370/254 |
| 2010/0191612 A1 | 7/2010 | Raleigh | |
| 2010/0325232 A1 | 12/2010 | Zhang et al. | |
| 2011/0029670 A1 | 2/2011 | Klein et al. | |
| 2011/0286437 A1 | 11/2011 | Austin et al. | |
| 2011/0319071 A1 | 12/2011 | Beppler et al. | |
| 2012/0052814 A1 | 3/2012 | Gerber et al. | |
| 2012/0102164 A1 | 4/2012 | Gruen et al. | |
| 2012/0303556 A1 | 11/2012 | Lin et al. | |
| 2013/0307723 A1 | 11/2013 | Garin et al. | |
| 2014/0036768 A1 | 2/2014 | Gao et al. | |
| 2014/0067938 A1 | 3/2014 | Boldyrev et al. | |
| 2014/0071895 A1 | 3/2014 | Bane et al. | |
| 2014/0219181 A1 | 8/2014 | Chun et al. | |
| 2015/0009839 A1 | 1/2015 | Shikama | |
| 2015/0045054 A1 | 2/2015 | Emadzadeh et al. | |
| 2015/0094088 A1 | 4/2015 | Chen | |
| 2015/0134798 A1 | 5/2015 | Tofighbakhsh et al. | |
| 2015/0139074 A1 | 5/2015 | Bane et al. | |
| 2015/0304920 A1 | 10/2015 | Cootey | |
| 2015/0333852 A1 | 11/2015 | Yoshizawa | |
| 2015/0365881 A1 | 12/2015 | Scherzer et al. | |
| 2016/0205238 A1 | 7/2016 | Abramson et al. | |
| 2016/0242042 A1 | 8/2016 | Brisebois et al. | |
| 2016/0309537 A1 | 10/2016 | Hart et al. | |
| 2016/0345289 A1 | 11/2016 | Mayor et al. | |
| 2016/0351045 A1 | 12/2016 | Salter | |
| 2016/0353314 A1 | 12/2016 | Chow et al. | |
| 2016/0359659 A1 | 12/2016 | MacGougan et al. | |
| 2017/0026888 A1 | 1/2017 | Kwan | |
| 2017/0034023 A1 | 2/2017 | Nickolov et al. | |
| 2017/0034657 A1 | 2/2017 | Banin et al. | |
| 2017/0104609 A1 | 4/2017 | Mcnamee et al. | |
| 2017/0104647 A1 | 4/2017 | Chaiyochlarb et al. | |
| 2017/0208563 A1 | 7/2017 | Fischer et al. | |
| 2017/0222901 A1 | 8/2017 | Jain et al. | |

FOREIGN PATENT DOCUMENTS

| | | |
|---|---|---|
| EP | 2 853 122 A2 | 4/2015 |
| EP | 2 880 606 A2 | 6/2015 |
| WO | 2012/075052 A1 | 6/2012 |
| WO | 2015/161519 A1 | 10/2015 |
| WO | 2017/114969 A1 | 7/2017 |

OTHER PUBLICATIONS

"Mobiperf", Last accessed Jan. 4, 2018, 2 pages, https://sites.google.com/site/mobiperfdev/home/new-features.

Baltrunas et al., "Measuring the Reliability of Mobile Broadband Networks," Proceedings of the 2014 Conference on Internet Measurement Conference, 2014, pp. 45-58, ACM, 14 pages.

Vallina-Rodriguez et al., "Beyond the Radio: Illuminating the Higher Layers of Mobile Networks," Proceedings of the 13th Annual International Conference on Mobile Systems, Applications, and Services, May 2015, ACM, 13 pages.

Liang et al., "Where am I? Characterizing and Improving the Localization Performance of Off-The-Shelf Mobile Devices Through Cooperation," Proceedings of the NOMS 2016: 2016 IEEE/IFIP Network Operations and Management Symposium, Apr. 2016, IEEE, 9 pages.

Bicocchi et al., "Collective Awareness for Human-ICT Collaboration in Smart Cities," Workshops on Enabling Technologies: Infrastructure for Collaborative Enterprises, 2013, IEEE, 6 pages.

Skorin-Kapov et al., "Approaches for Utility-Based QoE-Driven Optimization of Network Resource Allocation for Multimedia Services," Data Traffic Monitoring and Analysis, 2013, pp. 337-358, 22 pages.

Chen et al., "Quadrant of Euphoria: A Crowdsourcing Platform for QoE Assessment", IEEE Network, Apr. 2010, pp. 28-35, vol. 24, No. 2, 17 pages. http://mmnet.iis.sinica.edu.tw/pub/chen10_qoe.pdf.

(56) References Cited

OTHER PUBLICATIONS

Li et al., "MobileInsight: Extracting and Analyzing Cellular Network Information on Smartphones," The 22nd Annual International Conference on Mobile Computing and Networking, Oct. 2016, pp. 202-215, ACM, 14 pages.
Jannucci et al., "CROSSMobile: A Cross-Layer Architecture for Next-Generation Wireless Systems," Mar. 25, 2014, CMU-SV Technical Report 14-001, Carnegie Mellon University, 11 pages. http://repository.cmu.edu/cgi/viewcontent.cgi?article=1175&context=silicon_valley.
"InSSIDer," MetaGeek, LLC, 4 pages. Last accessed Sep. 2017. http://www.metageek.com/products/inssider/index-2.html.
"Monitoring and Troubleshooting VoIP Networks with a Network Analyzer," 2008, TamoSoft, 17 pages. http://www.tamos.com/docs/voip-analysis.pdf.
Nicholson et al., "Improved Access Point Selection," Proceedings of the 4th International Conference on Mobile Systems, Applications and Services (MobiSys'06), Jun. 2006, pp. 233-245, ACM, 13 pages.
Alzantot et al., "Crowdinside: Automatic Construction of Indoor Floorplans," Proceedings of the 20th International Conference on Advances in Geographic Information Systems, Sep. 2012, ACM, 11 pages, https://arxiv.org/pdf/1209.3794.pdf.
"All the networks. Found by Everyone," bobzilla && arkasha && uhtu, 2 pages. Last accessed Sep. 2017.https://wigle.net/.
"Wi-Fi positioning system," Wikipedia, 5 pages. https://en.wikipedia.org/w/index.php?title=Wi-Fi_positioning_system&oldid=797615394.
Brisebois et al., "Facilitating Mobile Device Self-Optimizing Technology Selection Thresholds in a Wireless Communication System," Unpublished U.S. Appl. No. 15/462,112, filed Mar. 17, 2017, AT&T, 71 pages.
Non-Final Office Action received for U.S. Appl. No. 15/721,326 dated Jan. 30, 2018, 37 pages.
Non-Final Office Action received for U.S. Appl. No. 15/721,308 dated Mar. 15, 2018 38 pages.
Non-Final Office Action received for U.S. Appl. No. 15/721,335 dated Feb. 26, 2018 33 pages.
Final Office Action received for U.S. Appl. No. 15/721,335, dated Aug. 13, 2018, 25 pages.
Final Office Action received for U.S. Appl. No. 15/721,326, dated Aug. 24, 2018, 30 pages.
Non-Final Office Action received for U.S. Appl. No. 16/293,827 dated Apr. 4, 2019, 29 pages.
Notice of Allowance received for U.S. Appl. No. 16/293,827 dated Jul. 1, 2019, 17 pages.
Non-Final Office Action received for U.S. Appl. No. 16/251,404 dated Aug. 26, 2019, 35 pages.
Non-Final Office Action received for U.S. Appl. No. 16/448,107 dated Jan. 24, 2020, 39 pages.
Notice of Allowance received for U.S. Appl. No. 16/448,107 dated Mar. 23, 2020, 26 pages.
Non-Final Office Action received for U.S. Appl. No. 16/908,041 dated Aug. 17, 2021, 54 pages.
Notice of Allowance received for U.S. Appl. No. 16/908,041 dated Dec. 16, 2021, 45 pages.
U.S. Appl. No. 16/860,580, filed Apr. 28, 2020.
U.S. Appl. No. 16/251,404, filed Jan. 18, 2019.
U.S. Appl. No. 15/721,308, filed Sep. 29, 2017.

* cited by examiner

| Wi-Fi | Wi-Fi Direct | ADVANCED | | | Date: 12/20/16 | 600 |
|---|---|---|---|---|---|---|
| On | | | | | | |
| Old Work | MAC 0b:5c:44:28:3a:ec | Expired? N | Location 33.848997, -84.343563 | WiFi Calling IN -75dBm | WiFi Calling OUT -80dBm | |
| Metro WiFi | MAC ec:bd:1d:8a:50:51 | Expired? N | Location 33.848721, -84.343517 | WiFi Calling IN -30dBm | WiFi Calling OUT -35dBm | |
| Neighbor1 | MAC ec:bd:1d:8a:50:5e | Expired? N | Location 33.847774, -84.341861 | WiFi Calling IN -75dBm | WiFi Calling OUT -80dBm | |
| Neighbor2 | MAC ec:bd:1d:8d:31:8e | Expired? N | Location 33.848403, -84.342844 | WiFi Calling IN -75dBm | WiFi Calling OUT -80dBm | |
| Friend's house | MAC 5c:83:8f:58:bc:ae | Expired? N | Location 33.849977, -84.343568 | WiFi Calling IN -65dBm | WiFi Calling OUT -70dBm | |
| Starbucks | MAC 1c:afbd:32:4e:9b | Expired? N | Location 33.844997, -84.343363 | WiFi Calling IN -50dBm | WiFi Calling OUT -55dBm | |
| Barnes & Noble | MAC de:73:d0:13:7a:5c | Expired? N | Location 33.858397, -84.343263 | WiFi Calling IN -30dBm | WiFi Calling OUT -35dBm | |
| Mom's house | MAC cc:6d:a9:10:8f:43 | Expired? N | Location 33.849397, -84.341563 | WiFi Calling IN -75dBm | WiFi Calling OUT -80dBm | |
| Home Connected | MAC fc:8f:c4:09:6e:66 | Expired? N | Location 33.848391, -84.344532 | WiFi Calling IN -70dBm | WiFi Calling OUT -75dBm | |

FIG. 6

| SSID | MAC | Last Update | Age (days) | Expired? | Location | WiFi Calling IN | WiFi Calling OUT |
|---|---|---|---|---|---|---|---|
| Barnes & Noble | de:73:d3:13:7a:5c | 12/21/16 | 0 | N | 33.858397, -84.343263 | -30dBm | -35dBm |
| Barnes & Noble | xx:xx:xx:xx:xx:xg | 12/18/16 | 3 | N | xx.xxxxxx, -xx.xxxxx1 | -xxdBm | -xxdBm |
| Barnes & Noble | xx:xx:xx:xx:xx:xb | 12/16/16 | 5 | N | xx.xxxxxx, -xx.xxxxx2 | -xxdBm | -xxdBm |
| Mc Donalds | xx:xx:xx:xx:xx:xc | 12/20/16 | 1 | N | xx.xxxxxx, -xx.xxxxx3 | -xxdBm | -xxdBm |
| Mc Donalds | xx:xx:xx:xx:xx:xd | 12/17/16 | 4 | N | xx.xxxxxx, -xx.xxxxx4 | -xxdBm | -xxdBm |
| Mc Donalds | xx:xx:xx:xx:xx:xe | 12/15/16 | 6 | N | xx.xxxxxx, -xx.xxxxx5 | -xxdBm | -xxdBm |
| Mc Donalds | xx:xx:xx:xx:xx:xf | 12/12/16 | 9 | Y | xx.xxxxxx, -xx.xxxxx6 | -xxdBm | -xxdBm |
| New Work | 0b:5c:44:28:3b:ec | 12/21/16 | 0 | N | 33.848397, -84.343363 | -75dBm | -80dBm |
| Starbucks | 1caf:bd:32:4e:8b | 12/21/16 | 0 | N | 33.844397, -84.343363 | -50dBm | -55dBm |
| Starbucks | xx:xx:xx:xx:xx:xg | 12/19/16 | 2 | N | xx.xxxxxx, -xx.xxxxx7 | -xxdBm | -xxdBm |
| Starbucks | xx:xx:xx:xx:xx:xh | 12/16/16 | 5 | N | xx.xxxxxx, -xx.xxxxx8 | -xxdBm | -xxdBm |
| Starbucks | xx:xx:xx:xx:xx:xi | 12/14/16 | 7 | N | xx.xxxxxx, -xx.xxxxx9 | -xxdBm | -xxdBm |
| Starbucks | xx:xx:xx:xx:xx:xj | 12/11/16 | 10 | Y | xx.xxxxxx, -xx.xxxx10 | -xxdBm | -xxdBm |

| | MAC | Expired? | Location | WiFi Calling IN | WiFi Calling OUT |
|---|---|---|---|---|---|
| New Work | 0b:5c:44:28:3b:ec | ?? - N | 33.848397, -84.343563 | ?? -70dBm | ?? -75dBm |
| Metro WiFi | ec:bd:1d:8a:50:51 | N | 33.848721, -84.343517 | -30dBm | -35dBm |
| Neighbor1 | ec:bd:1d:8a:50:5a | N | 33.847774, -84.341661 | -75dBm | -80dBm |
| Neighbor2 | ec:bd:1d:8d:31:8e | N | 33.848402, -84.342844 | -75dBm | -80dBm |
| Friend's house | 5c:83:81:58:b:ae | N | 33.848377, -84.343568 | -65dBm | -70dBm |
| Starbucks | 1ca:bd:32:4e:9b | N | 33.844397, -84.343563 | -50dBm | -55dBm |
| Barnes & Noble | de:73:d3:13:7a:5c | N | 33.858397, -84.343263 | -30dBm | -35dBm |
| Mom's house | cc:6d:a3:10:3f:43 | N | 33.849397, -84.341563 | -75dBm | -80dBm |
| Home Connected | fc:8f:c4:09:6e:66 | N | 33.848391, -84.344532 | -70dBm | -75dBm |

| SSID | MAC | Last Update | Age (days) | Expired? | Location | WiFi Calling IN | WiFi Calling OUT |
|---|---|---|---|---|---|---|---|
| Barnes & Noble | de:73:d3:13:7a:5c | 12/21/16 | 1 | N | 33.858397, -84.343263 | -30dBm | -35dBm |
| Barnes & Noble | xx:xx:xx:xx:xx:xa | 12/18/16 | 4 | N | xx.xxxxxx, -xx.xxxxx1 | -xxdBm | -xxdBm |
| Barnes & Noble | xx:xx:xx:xx:xx:xb | 12/16/16 | 6 | N | xx.xxxxxx, -xx.xxxxx2 | -xxdBm | -xxdBm |
| McDonalds | xx:xx:xx:xx:xx:xc | 12/20/16 | 2 | N | xx.xxxxxx, -xx.xxxxx3 | -xxdBm | -xxdBm |
| McDonalds | xx:xx:xx:xx:xx:xd | 12/17/16 | 5 | N | xx.xxxxxx, -xx.xxxxx4 | -xxdBm | -xxdBm |
| McDonalds | xx:xx:xx:xx:xx:xe | 12/15/16 | 7 | N | xx.xxxxxx, -xx.xxxxx5 | -xxdBm | -xxdBm |
| McDonalds | xx:xx:xx:xx:xx:xf | 12/12/16 | 10 | Y | xx.xxxxxx, -xx.xxxxx6 | -xxdBm | -xxdBm |
| New Work | 0b:5c:44:28:3b:ec | 12/22/16 | 0 | N | 33.844397, -84.343563 | -75dBm | -80dBm |
| Starbucks | 1caf:bd:32:4e:8b | 12/21/16 | 1 | N | 33.844397, -84.343363 | -50dBm | -55dBm |
| Starbucks | xx:xx:xx:xx:xx:xg | 12/19/16 | 3 | N | xx.xxxxxx, -xx.xxxxx7 | -xxdBm | -xxdBm |
| Starbucks | xx:xx:xx:xx:xx:xh | 12/16/16 | 6 | N | xx.xxxxxx, -xx.xxxxx8 | -xxdBm | -xxdBm |
| Starbucks | xx:xx:xx:xx:xx:xi | 12/14/16 | 8 | Y | xx.xxxxxx, -xx.xxxxx9 | -xxdBm | -xxdBm |
| Starbucks | xx:xx:xx:xx:xx:xj | 12/11/16 | 11 | Y | xx.xxxxxx, -xx.xxxxx0 | -xxdBm | -xxdBm |

| | Max age | Today |
|---|---|---|
| | 7 | 12/22/16 |

| | | | | Date: 12/20/16 | |
|---|---|---|---|---|---|
| Wi-Fi | Wi-Fi Direct | ADVANCED | | | |
| On | | ⬤ | | | |
| 📶 Old Work | MAC<br>0b:5c:44:28:3a:ec | Band/channel<br>2.4Ghz / ch1 | Expired?<br>N | Location<br>33.848397, 84.343363 | WiFi Calling IN<br>-60dBm | WiFi Calling OUT<br>-65dBm |
| 📶 Metro WiFi | MAC<br>ec:bc:16:8a:50:51 | Band/channel<br>2.4Ghz / ch1 | Expired?<br>N | Location<br>33.848395, 84.343564 | WiFi Calling IN<br>-30dBm | WiFi Calling OUT<br>-35dBm |
| 📶 Neighbor1 | MAC<br>ec:bc:16:8a:50:5e | Band/channel<br>5Ghz / ch36 | Expired?<br>N | Location<br>33.847774, 84.341661 | WiFi Calling IN<br>-75dBm | WiFi Calling OUT<br>-80dBm |
| 📶 Neighbor2 | MAC<br>ec:bc:16:6d:31:8e | Band/channel<br>2.4Ghz / ch11 | Expired?<br>N | Location<br>33.848403, 84.342344 | WiFi Calling IN<br>-75dBm | WiFi Calling OUT<br>-80dBm |
| 📶 Friend's house | MAC<br>5c:83:8f:68:bc:ae | Band/channel<br>5Ghz / ch42 | Expired?<br>N | Location<br>33.846977, 84.343568 | WiFi Calling IN<br>-65dBm | WiFi Calling OUT<br>-70dBm |
| 📶 Starbucks | MAC<br>1c:af:bd:32:4e:5b | Band/channel<br>2.4Ghz / ch6 | Expired?<br>N | Location<br>33.844397, 84.343363 | WiFi Calling IN<br>-50dBm | WiFi Calling OUT<br>-55dBm |
| 📶 Barnes & Noble | MAC<br>da:73:db:13:7a:5a | Band/channel<br>2.4Ghz / ch5 | Expired?<br>N | Location<br>33.853397, 84.343263 | WiFi Calling IN<br>-30dBm | WiFi Calling OUT<br>-35dBm |
| 📶 Mom's house | MAC<br>cc:6d:a3:10:8f:43 | Band/channel<br>2.4Ghz / ch4 | Expired?<br>N | Location<br>33.849397, 84.341563 | WiFi Calling IN<br>-75dBm | WiFi Calling OUT<br>-80dBm |
| 📶 Home<br>Connected | MAC<br>fc:8f:c4:08:6e:66 | Band/channel<br>5Ghz / ch36 | Expired?<br>N | Location<br>33.848391, 84.344532 | WiFi Calling IN<br>-70dBm | WiFi Calling OUT<br>-75dBm |

| Wi-Fi | | | | | | |
|---|---|---|---|---|---|---|
| On | Wi-Fi Direct | ADVANCED 104 | | | | |
| New Work | MAC 0b:5c:44:23:9b:ac | Band/channel 2.4GHz / ch1 | Expired? N | Location 33.848397, -84.343263 | WiFi Calling IN -40dBm | WiFi Calling OUT -65dBm |
| Metro WiFi | MAC ec:bd:1d:8a:50:51 | Band/channel 2.4GHz / ch1 | Expired? N | Location 33.848347, -84.343213 | WiFi Calling IN -30dBm | WiFi Calling OUT -35dBm |
| Neighbor1 | MAC ec:bd:1d:8a:50:5e | Band/channel 5GHz / ch36 | Expired? N | Location 33.847774, -84.341661 | WiFi Calling IN -75dBm | WiFi Calling OUT -80dBm |
| Neighbor2 | MAC ec:bd:1d:3d:31:8e | Band/channel 2.4GHz / ch11 | Expired? N | Location 33.848403, -84.342344 | WiFi Calling IN -75dBm | WiFi Calling OUT -80dBm |
| Friend's house | MAC 5c:63:bf:58:fc:ae | Band/channel 5GHz / ch42 | Expired? N | Location 33.848277, -84.343368 | WiFi Calling IN -65dBm | WiFi Calling OUT -70dBm |
| Starbucks | MAC 1c:af:bd:32:4e:8b | Band/channel 2.4GHz / ch6 | Expired? N | Location 33.844397, -84.343363 | WiFi Calling IN -50dBm | WiFi Calling OUT -55dBm |
| Barnes & Noble | MAC de:73:d3:f3:37:a:5c | Band/channel 2.4GHz / ch8 | Expired? N | Location 33.858397, -84.343353 | WiFi Calling IN -30dBm | WiFi Calling OUT -35dBm |
| Mom's house | MAC 0c:6d:a3:10:8f:43 | Band/channel 2.4GHz / ch4 | Expired? N | Location 33.849397, -84.341563 | WiFi Calling IN -75dBm | WiFi Calling OUT -80dBm |
| Home Connected | MAC fc:8f:04:09:6e:66 | Band/channel 5GHz / ch33 | Expired? N | Location 33.848391, -84.344502 | WiFi Calling IN -70dBm | WiFi Calling OUT -75dBm |

Cloud 404

|  |  |  |  |  |  | Max age | Today |  |  |  |
|  |  |  |  |  |  | 7 | 12/21/16 |  |  |  |
| SSID | MAC | Controlled? | Band/channel | Last Update | Age (days) | Expired? | Location | WiFi Calling IN | WiFi Calling OUT |
|---|---|---|---|---|---|---|---|---|---|
| Barnes & Noble | de:73:d3:17a:... | Y | 2.4GHz / ch8 | 12/21/16 | 0 | N | 33.858397, -84.343263 | -30dBm | -35dBm |
| Barnes & Noble | xxx:xxx:xx:xx:... | Y | xxx / xxx | 12/18/16 | 3 | N | xx.xxxxxx, -xx.xxxxx1 | -xxdBm | -xxdBm |
| Barnes & Noble | xxx:xxx:xx:xx:... | Y | xxx / xxx | 12/16/16 | 5 | N | xx.xxxxxx, -xx.xxxxx2 | -xxdBm | -xxdBm |
| McDonalds | xxx:xxx:xx:xx:... | Y | xxx / xxx | 12/17/16 | 4 | N | xx.xxxxxx, -xx.xxxxx3 | -xxdBm | -xxdBm |
| McDonalds | xxx:xxx:xx:xx:... | Y | xxx / xxx | 12/15/16 | 6 | N | xx.xxxxxx, -xx.xxxxx4 | -xxdBm | -xxdBm |
| Metro WiFi | ec:bd:1d:8a:50:51 | N | 2.4GHz / ch1 | 12/20/16 | 1 | N | 33.848347, -84.343213 | -30dBm | -35dBm |
| New Work | 0b:5c:44:28:3b:ec | Y | 2.4GHz / ch1 | 12/21/16 | 0 | N | 33.848397, -84.343263 | -60dBm | -65dBm |
| Starbucks | 1caf:bd:32:4e:8b | N | 2.4GHz / ch6 | 12/21/16 | 0 | N | 33.844397, -84.343363 | -50dBm | -55dBm |
| Starbucks | xxx:xxx:xx:xx:... | N | xxx / xxx | 12/19/16 | 2 | N | xx.xxxxxx, -xx.xxxxx7 | -xxdBm | -xxdBm |
| Starbucks | xxx:xxx:xx:xx:... | N | xxx / xxx | 12/16/16 | 5 | N | xx.xxxxxx, -xx.xxxxx8 | -xxdBm | -xxdBm |
| Starbucks | xxx:xxx:xx:xx:... | N | xxx / xxx | 12/14/16 | 7 | N | xx.xxxxxx, -xx.xxxxx9 | -xxdBm | -xxdBm |
| Starbucks | xxx:xxx:xx:xx:... | N | xxx / xxx | 12/11/16 | 10 | Y | xx.xxxxxx, -xx.xxxx10 | -xxdBm | -xxdBm |

Controlled APs / Uncontrolled APs

FIG. 22

| SSID | MAC | Controlled? | Band/channel | Last Update | Age (days) | Expired? | Location | WiFi Calling IN | WiFi Calling OUT |
|---|---|---|---|---|---|---|---|---|---|
| Barnes & Noble | de:73:d3:13:7a:5c | Y | 2.4GHz / ch8 | 12/21/16 | 0 | N | 33.858397, -84.343263 | -80dBm | -85dBm |
| Barnes & Noble | xxxxxxxxxxxx | Y | xxx / xxx | 12/19/16 | 3 | N | xx.xxxxxx, -xx.xxxxxx | -xxdBm | -xxdBm |
| Barnes & Noble | xxxxxxxxxxxx | Y | xxx / xxx | 12/18/16 | | | xx.xxxxx, -xx.xxxxx | -xxdBm | -xxdBm |
| Mc Donalds | xxxxxxxxxxxx | Y | xxx / xxx | 12/17/16 | 4 | N | xx.xxxxx, -xx.xxxxx | -xxdBm | -xxdBm |
| Mc Donalds | xxxxxxxxxxxx | Y | xxx / xxx | 12/19/16 | 0 | N | xx.xxxxx, -xx.xxxxx | -xxdBm | -xxdBm |
| Metro WiFi | ec:bd:1d:8a:50:51 | N | 2.4GHz / ch1 | 12/20/16 | 1 | N | 33.848347, -84.343213 | -30dBm | -35dBm |
| New Work | 0b:5c:44:28:3b:ec | Y | 2.4GHz / ch1 | 12/21/16 | 0 | N | 33.848397, -84.343263 | -60dBm | -65dBm |
| Starbucks | 1c:af:bd:32:4e:8b | N | 2.4GHz / ch6 | 12/21/16 | 0 | N | 33.844397, -84.343363 | -75dBm | -80dBm |
| Starbucks | xxxxxxxxxxxx | N | xxx / xxx | 12/09/16 | 2 | N | xx.xxxxx, -xx.xxxxx | -xxdBm | -xxdBm |
| Starbucks | xxxxxxxxxxxx | N | xxx / xxx | 12/11/16 | 10 | Y | xx.xxxxx, -xx.xxxxx | -xxdBm | -xxdBm |
| Starbucks | xxxxxxxxxxxx | N | xxx / xxx | | | | | -xxdBm | -xxdBm |
| Starbucks | xxxxxxxxxxxx | N | xxx / xxx | | | | | -xxdBm | -xxdBm |

Max age: 7  Today: 12/21/16

Problem: Thresholds are high to avoid filter due to interference

Normal: Thresholds are low but based on close proximity

| SSID | MAC | Controlled? | Band/channel | Last Update | Age (days) | Expired? | Location | WiFi Calling IN | WiFi Calling OUT |
|---|---|---|---|---|---|---|---|---|---|
| | | | | | | Max age | Today | | |
| | | | | | | 7 | 12/21/16 | | |
| Barnes & Noble | de:73:d3:13:7a:5c | Y | 2.4GHz / ch8 | 12/21/16 | 0 | N | 33.858397, -84.343263 | -80dBm | -85dBm |
| Barnes & Noble | xx:xx:xx:xx:xx:xx | Y | xxx / xxx | 12/18/16 | 3 | N | xx.xxxxxx, -xx.xxxxxx | -xxdBm | -xxdBm |
| Barnes & Noble | xx:xx:xx:xx:xx:xx | Y | xxx / xxx | 12/16/16 | 5 | N | xx.xxxxxx, -xx.xxxxxx | -xxdBm | -xxdBm |
| Mc Donalds | xx:xx:xx:xx:xx:xx | Y | xxx / xxx | 12/20/16 | 1 | N | xx.xxxxxx, -xx.xxxxxx | -xxdBm | -xxdBm |
| Mc Donalds | xx:xx:xx:xx:xx:xx | Y | xxx / xxx | 12/17/16 | 4 | N | xx.xxxxxx, -xx.xxxxxx | -xxdBm | -xxdBm |
| Mc Donalds | xx:xx:xx:xx:xx:xx | Y | xxx / xxx | 12/15/16 | 6 | N | xx.xxxxxx, -xx.xxxxxx | -xxdBm | -xxdBm |
| Metro WiFi | ec:bd:1d:8a:50:51 | N | 2.4GHz / ch1 | 12/20/16 | 1 | N | 33.848347, -84.343213 | -30dBm | -35dBm |
| New Work | 0b:5c:44:28:3b:ec | Y | 2.4GHz / ch1 | 12/21/16 | 0 | N | 33.848397, -84.343263 | -60dBm | -65dBm |
| Starbucks | 1c:af:bd:32:4e:8b | N | 2.4GHz / ch6 | 12/21/16 | 0 | N | 33.858397, -84.343363 | -75dBm | -80dBm |
| Starbucks | xx:xx:xx:xx:xx:xx | N | xxx / xxx | 12/19/16 | 2 | N | xx.xxxxxx, -xx.xxxxxx | -xxdBm | -xxdBm |
| Starbucks | xx:xx:xx:xx:xx:xx | N | xxx / xxx | 12/16/16 | 5 | N | xx.xxxxxx, -xx.xxxxxx | -xxdBm | -xxdBm |
| Starbucks | xx:xx:xx:xx:xx:xx | N | xxx / xxx | 12/14/16 | 7 | N | xx.xxxxxx, -xx.xxxxxx | -xxdBm | -xxdBm |
| Starbucks | xx:xx:xx:xx:xx:xx | N | xxx / xxx | 12/11/16 | 10 | Y | xx.xxxxxx, -xx.xxxxxx | -xxdBm | -xxdBm |

Annotations:
1. Victim AP has high thresholds due to interference
2. Are there other APs nearby?
3. Are the nearby APs using the same or adjacent / overlapping frequency
4. Are the nearby APs also experiencing performance degradation due to interference

NETWORK PLANNING BASED ON CROWD-SOURCED ACCESS POINT DATA FOR 5G OR OTHER NEXT GENERATION NETWORK

RELATED APPLICATIONS

The subject patent application is a continuation of, and claims priority to each of, U.S. patent application Ser. No. 16/860,580 (now U.S. Pat. No. 11,375,382), filed Apr. 28, 2020, and entitled "NETWORK PLANNING BASED ON CROWD-SOURCED ACCESS POINT DATA FOR 5G OR OTHER NEXT GENERATION NETWORK," which is a continuation of U.S. patent application Ser. No. 16/251,404 (now U.S. Pat. No. 10,674,372), filed Jan. 18, 2019, and entitled "NETWORK PLANNING BASED ON CROWD-SOURCED ACCESS POINT DATA FOR 5G OR OTHER NEXT GENERATION NETWORK," which is a continuation of U.S. patent application Ser. No. 15/721,308 (now U.S. Pat. No. 10,231,134), filed Sep. 29, 2017, and entitled "NETWORK PLANNING BASED ON CROWD-SOURCED ACCESS POINT DATA FOR 5G OR OTHER NEXT GENERATION NETWORK," the entireties of which priority applications are hereby incorporated by reference herein.

TECHNICAL FIELD

This disclosure relates generally to facilitation of network planning based on a collection of crowd-sourced access point data. For example, this disclosure relates to facilitating network planning based on a collection of crowd-sourced access point data to determine thresholds for signal transfer in a 5G, or other next generation network.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to a crowd-sourced access point data is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 6 illustrates an example schematic system block diagram of an expanded user equipment Wi-Fi access point list with self-optimized thresholds according to one or more embodiments.

FIG. 8 illustrates an example schematic system block diagram of a user equipment upload of initial access point threshold information to an access point database according to one or more embodiments.

FIG. 13 illustrates an example schematic system block diagram for a user equipment to obtain crowd-sourced AP thresholds from a cloud access point database according to one or more embodiments.

FIG. 18 illustrates an example schematic system block diagram for user equipment to obtain crowd-sourced access point thresholds from a cloud access point database.

FIG. 19 illustrates an example schematic system block diagram of an expanded user equipment Wi-Fi access point list with frequency information according to one or more embodiments.

FIG. 20 illustrates an example schematic system block diagram for user equipment to upload initial access point frequency and threshold information to an access point database according to one or more embodiments.

FIG. 22 illustrates an example schematic system block diagram of a controlled and an uncontrolled access point status in the central access point database according to one or more embodiments.

FIG. 23 illustrates an example schematic system block diagram for identifying problematic access points according to one or more embodiments.

FIG. 24 illustrates an example schematic system block diagram for identifying problematic access point pairs according to one or more embodiments.

DETAILED DESCRIPTION

Figure 1:
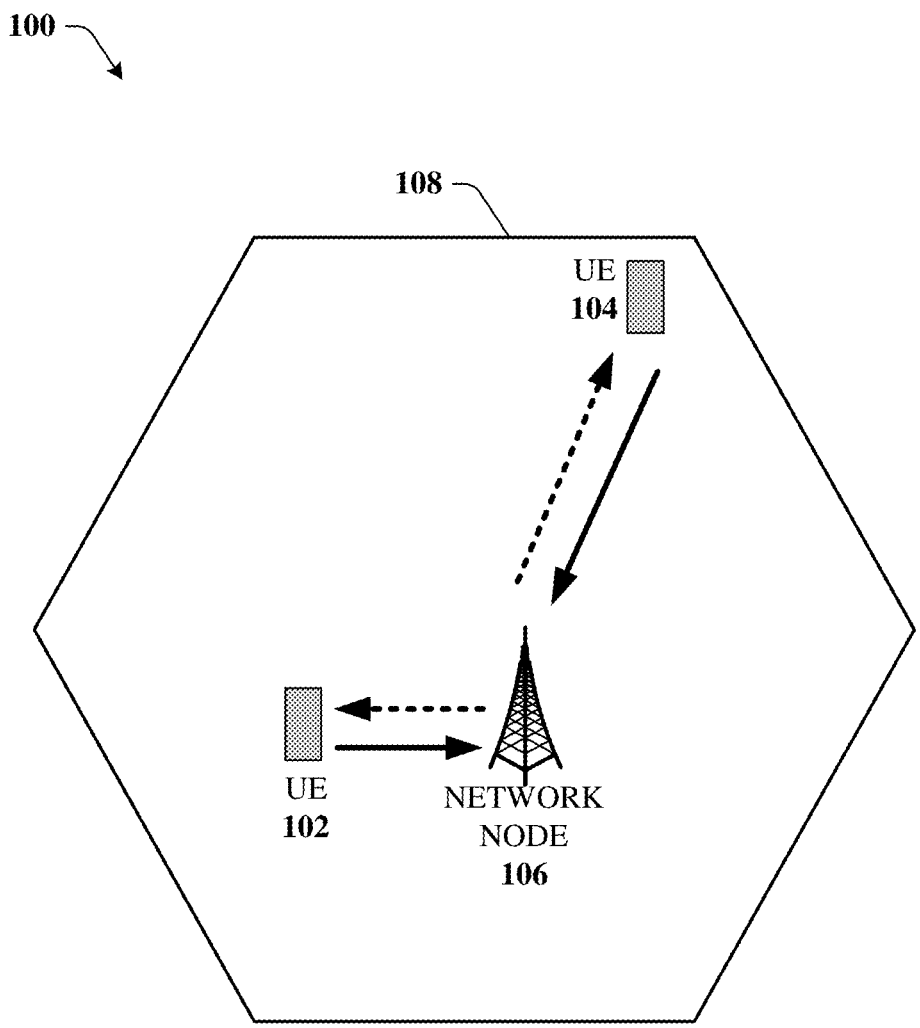
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate of network planning based on a collection of crowd-sourced access point data for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate network planning based on a collection of crowd-sourced access point data for a 5G network. Facilitating network planning based on a collection of crowd-sourced access point data for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Collection of crowd-sourced access point quality and selection data for intelligent network selection can assist cloud-based applications in building a database of access point quality data and thresholds suitable for real-time and other jitter-sensitive services. User equipment (UE) jitter measurements and selection thresholds can be collected at a cloud platform, which creates access point performance and selection threshold profiles.

Network operators can make use of less expensive wireless data transport mechanisms (e.g., broadcast, Wi-Fi, etc.) to serve more traffic with less cellular network capacity and cost impact—typically called "data offload". Although VoLTE (voice over LTE) to VoWiFI (voice over Wi-Fi) data offload examples will be used throughout this disclosure, it should be understood that other service and technology combinations are possible. During data offload processes, the subscriber should not be able to tell the difference between a voice call delivered over VoLTE or VoWiFi. This challenge is relatively easy to meet for best-effort data services, for which non-real-time applications and extensive buffering can work around jitter and other artifacts of a sub-optimal Wi-Fi network path. For this reason, traditional Wi-Fi selection mechanisms made technology selection decisions using received signal strength indicator (RSSI) measurements and thresholds. According to these existing mechanisms, most smartphones already select different radio paths for best-effort data services (e.g., applications and browsing) versus VoLTE. However, these mechanisms are not suitable for voice or other jitter-sensitive services over Wi-Fi because: 1) voice is a real-time service for which packet flow consistency is critical—if voice packets are not received in order and according to a constant and evenly-spaced flow (jitter occurs), and voice packet playback can result in distorted and otherwise unintelligible voice call experiences; and 2) end-to-end Wi-Fi transmission quality is affected by more than RSSI. For instance, Wi-Fi jitter can degrade when RSSI is low. Wi-Fi jitter can also degrade when there is interference from other Wi-Fi access points, other users sharing overloaded Wi-Fi radio, and/or transport (DSL line, for example) resources. Wi-Fi radio and transport are therefore relatively unpredictable in terms of jitter performance because they are provided by subscriber or third parties and are not managed by network operators. Wi-Fi jitter can be tested before an access point (AP) is chosen to serve a real-time service like VoWiFi. If the jitter test fails, the Wi-Fi access point is not used for VoWiFi, even if the Wi-Fi AP is useful for best effort data services.

This process can prevent voice over bad Wi-Fi, but it is likely to be repeated many times if the same Wi-Fi access point is consistently bad. The repeated jitter measurement can drain network resources and UE battery life. As UEs detect and test access points for jitter, the UEs can optimize thresholds and build an internal database of access point jitter and threshold settings per service. This process can reduce the number of times a UE takes new jitter measurements of frequently-detected access points, by using cached measurements and thresholds to determine when to select an access point for a service. However, this process limits the associated access point quality information collection and distribution to each individual UE. Therefore, consolidating UE-collected access point quality and threshold information can generate network efficiencies.

Although the below disclosure can refer to VoLTE (voice over LTE), VoWiFi (voice over Wi-Fi) and smartphone (UE) device examples, it should be understood that the concepts and principles can be applied to many other operator, service, technology and device combinations as well. Also note that these examples address automatic Wi-Fi frequency selection (to reduce interference and the need for high technology selection thresholds) but can also be used to adjust a variety of other Wi-Fi and other network technology (for example LTE-U) parameters as well.

This disclosure utilizes UE crowd-sourced AP information as inputs to a measurement-based Wi-Fi automatic frequency selection algorithm (e.g., self-organizing network (SON)). The process can comprise six steps: 1) adding frequency information to crowd-sourced AP data, 2) adding controlled or not controlled status to centralized AP database, 3) identifying problematic APs, 4) identifying problematic AP pairs, 5) optimizing controlled APs, and 6) optimizing for un-controlled APs.

For step one, the UE can test new APs and use the test results to optimize selection thresholds for sensitive services. In this case, the AP database and thresholds can be internal to the UE. The UE can upload this information to a centralized AP database (e.g., frequency band, channel information, etc.) and/or to the internal UE and centralized AP database. The UE can include band and channel information in the AP database update, which occurs each time a new AP is detected or expired measurements are refreshed.

The second step adds controlled and uncontrolled status indicators to the centralized AP database. For radio technologies on an unlicensed spectrum, there is often a mix of controlled enterprise or consumer APs and uncontrolled consumer or enterprise APs. Unlicensed spectrum interference in any given area is typically due to a mix of controlled and uncontrolled APs. For controlled APs, the service provider can change optimization parameters (e.g., Wi-Fi channel). However, for uncontrolled APs, these parameters are not configure-able. The ability or inability to change an AP frequency or other parameters is a key dependency for SON tools. Thus, the cloud AP database server can check and add "controlled" status to the AP database for each SSID plus MAC combination. Each SSID plus MAC combination can be checked against a service provider hosted AP database. For example, Barnes & Noble and McDonalds Wi-Fi can be hosted (under the control of) a specific wireless network service provider. Thus, in these cases the "controlled" status is "Yes". Conversely, a Metro Wi-Fi may not be hosted by a specific wireless network service provider and can be hosted by only by the user or another entity (e.g., Starbucks Wi-Fi can be hosted by Google). In these cases, the controlled status for the wireless network service provider status is "No". It should be noted that any indication of affirmation or denial can be used (e.g., 1 and 0, etc.). After checking the host state, the cloud AP database server can update the "Controlled" status for each SSID plus MAC combination in the centralized AP database.

In step three, the system can identify problematic APs. For example, VoWiFi thresholds can increase until jitter is measured to be less than 100 ms for the specific AP. For the sake of this example, consider cases where Wi-Fi interference is the most significant cause for jitter being greater than 100 ms. In this case, high service thresholds (e.g., Wi-Fi calling in and Wi-Fi calling out) can be an indication of high interference and therefore a problematic AP. The UE can be closer to the problematic AP (and further from the interference) before is it possible to receive voice packets with greater 100 ms of jitter. High service thresholds can be a good indicator of a problematic AP, which can benefit from automated optimization via a SON.

The system can identify problematic AP pairs during step four. In most cases, the interference to one AP is from another AP nearby. In many cases, both nearby APs are using the same or overlapping adjacent frequencies. Thus, both nearby APs with the same or overlapping adjacent frequencies can both be experiencing some form of mutual interference. These combinations (e.g., short distance, similar frequency, and/or degraded performance) are evident when crowd-sourced UE AP measurements are consolidated in a central AP database. The cloud-based AP database server or an adjunct SON application can filter and sort the central AP list (with crowd-sourced data) as follows: a) identify problematic APs with high threshold, b) filter adjacent APs within short distance of problematic APs, c) filter adjacent APs with the same and adjacent plus overlapping frequency as the problematic APs, d) sort same-frequency adjacent APs by threshold (e.g., high threshold at the top equates to receiving the most interference and the AP at the top of this list is the most likely interferer), e) pair the top adjacent AP (after b)-d) filter and sort) with the problematic AP. This yields the problematic AP pair.

Step five can optimize the controlled AP. As mentioned in step 2, some APs on the APs list are controlled and some are not. Ideally, the problematic APs are controlled and support automatic channel scan and selection. In this case, the SON application can send a channel scan and selection request to the problematic AP, and that AP can respond with the new band and/or channel it has selected and applied. The SON application can then update the band and/or channel field in the central AP database and set the "expired" flag to "Y" for both APs in the problematic pair. This will force the next UE to repeat jitter measurements and reset thresholds. Some problematic controlled APs may not support the automatic channel scan and selection method. If the top adjacent AP (other half of the AP pair from 4d)) is controlled and supports automatic channel scan and selection, then the SON application can send a channel scan and selection request to that adjacent AP. The top adjacent AP can respond with the new band and/or channel it has selected and applied. The SON application can then update the band and/or channel field in the central AP database and set the "expired" flag to "Y" for both APs in the problematic pair. This will also force the next UE to repeat jitter measurements and reset thresholds. If neither AP of the problematic AP pair support automatic channel scan and selection, then the SON application (using the AP list) can calculate minimum reuse distance (from the problematic AP) for each Wi-Fi channel. Next the SON application can sort the Wi-Fi channels in descending order by minimum reuse distance. The SON application can command the AP to retune to the Wi-Fi channel with the largest minimum reuse distance. The SON application can update the band and/or channel field in the central AP database and set the "expired" flag to "Y" for both APs in the problematic pair, yet again, forcing the next UE to repeat jitter measurements and reset thresholds.

Step six can optimize un-controlled APs. In some cases, the problematic APs cannot be controlled and the SON application cannot change the APs frequency. Thus, the next step is to check if the top adjacent AP (nearby with same or overlapping frequency and some degradation) is controlled. If the top adjacent AP (most likely interferer) is controlled and supports automatic channel scan and selection, then the SON application can send a channel scan and selection request to that adjacent AP. The top adjacent AP can respond with the new band and/or channel it has selected and applied. The SON application can update the band and/or channel field in the central AP database and set the "expired" flag to "Y" for both APs in the problematic pair, forcing the next UE to repeat jitter measurements and reset thresholds.

If the top adjacent AP is controlled but does not support automatic channel scan and selection, then the SON application (using the AP list) can calculate minimum reuse distance (from the top adjacent AP) for each Wi-Fi channel. Next, the SON application can sort the Wi-Fi channels in descending order by minimum reuse distance. The SON application can command the top adjacent AP to retune to the Wi-Fi channel with the largest minimum reuse distance. The SON application can update the band and/or channel field in the central AP database and set the "expired" flag to "Y" for both APs in the problematic pair. Consequently, this will force the next UE to repeat jitter measurements and reset thresholds. If the problematic and top adjacent AP are not controlled, then the SON application cannot implement a solution on any AP. Instead, the SON application can reduce the expiration time for the problematic AP information in the central AP database. This will prompt more UEs to update their jitter measurements and thresholds in the central AP database more frequently.

The SON mechanism describes a Wi-Fi adaptation, for which frequency changes are an option to avoid interference. In LTE or 5G cases, the carrier bandwidth is adjustable and can also be changed to avoid interference. For example, if a carrier is 20 Mhz wide and impaired, and the first 10 Mhz overlap a nearby AP which is also impaired (interference pair), then an interference reduction can be achieved by changing a center frequency (already covered) or adjusting the bandwidth to 10 Mhz and shifting the center frequency up to eliminate the frequency overlap with the other impaired AP. In heavily populated areas (with all spectrum in use nearby) this can be the only interference mitigation option. Therefore, where applicable, when the center frequency of an AP might be adjusted, the carrier bandwidth can also be adjusted.

As a pre-cursor to the aforementioned steps, the system can first recognize a received signal strength indicator (RSSI)/jitter mismatch for a specific Wi-Fi service set identifier (SSID). If the current RSSI requirements are met, yet the jitter is high, then there is an RSSI threshold/jitter mismatch (e.g., jitter fail). Second, the system can then adjust the RSSI threshold for the Wi-Fi SSID by raising the RSSI threshold by a margin, and then update the AP list with the new threshold values. Third, the system can then recheck the new RSSI threshold for jitter when a new RSSI threshold requirement is met for the specific Wi-Fi SSID. If the jitter at the new RSSI threshold is good, then the Wi-Fi SSID can be selected for communication. However, if the new RSSI threshold is bad, then the system can return to the first step to identify and re-adjust the threshold.

In one embodiment, described herein is a method comprising receiving, from a mobile device by a network device comprising a processor, frequency band data associated with a frequency band utilized for communication by an access point device, and determining, by the network device, a status of the access point device, resulting in a status determination. The method can comprise based on the status determination, updating, by the network device, a data structure of the network device with the status of the access point, resulting in an updated status. The method can also comprise, determining, by the network device, a signal interference associated with the access point device, and the method can comprise, in response to the determining the signal interference and based on the updated status, transmitting, by the network device, selection request data representative of a request to utilize a channel of the access point device.

According to another embodiment, a system can facilitate, receiving, from a mobile device of a wireless network, frequency band data associated with a frequency band utilized by an access point device of the wireless network for communication via the wireless network. The system can facilitate, in response to the receiving the frequency band data, updating a status of the access point device, wherein the status is associated with a service provider identity. The system can also facilitate receiving signal interference data associated with a signal interference of the access point device. Furthermore, in response to the receiving the signal interference data and the updating the status, the system can facilitate, sending selection request data, representative of a channel request, to the access point device.

According to yet another embodiment, described herein is a machine-readable storage medium that can perform the operations comprising receiving frequency band data associated with a frequency band utilized by an access point device. The machine-readable storage medium can determine a status of the access point device from the frequency band data comprising determining the status is associated with a service provider identity. Additionally, the machine-readable storage medium that can perform the operations comprising determining a signal interference associated with the access point device, and in response to the determining the signal interference and a condition associated with the status of the access point device being determined to have been satisfied, machine-readable storage medium that can perform the operations comprising modifying an expiration time associated with a signal quality applicable to a signal to be transmitted by the access point device.

These and other embodiments or implementations are described in more detail below with reference to the drawings.

Referring now to FIG. 1, illustrated is an example wireless communication system in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 106. The network node (e.g., network node device) can communicate with user equipment (UE), thus providing connectivity between the UE and the wider cellular network. The UE 102 can send transmission type recommendation data to the network node 106. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 106. The dashed arrow lines from the network node 106 to the UE 102 represent downlink (DL) communications and the solid arrow lines from the UE 102 to the network nodes 106 represents an uplink (UL) communication.

System 100 can further include one or more communication service provider networks that facilitate providing wireless communication services to various UEs, including UE 102, via the network node 106 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 106 can be connected to the one or more communication service provider networks via one or more cells 108. For example, the one or more cells 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more cells 108 can also include wireless link components, such as but not limited to, line-of-sight (LOS) or non-LOS links which can include terrestrial air-interfaces or deep space links (e.g., satellite communication links for navigation).

The system 100 can employ various cellular systems, technologies, and modulation modes to facilitate wireless radio communications between devices (e.g., the UE 102 and the network node 106). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000 etc.

For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of the system 100 are particularly described wherein the devices (e.g., the UEs 102 and the network device 104) of the system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency— for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
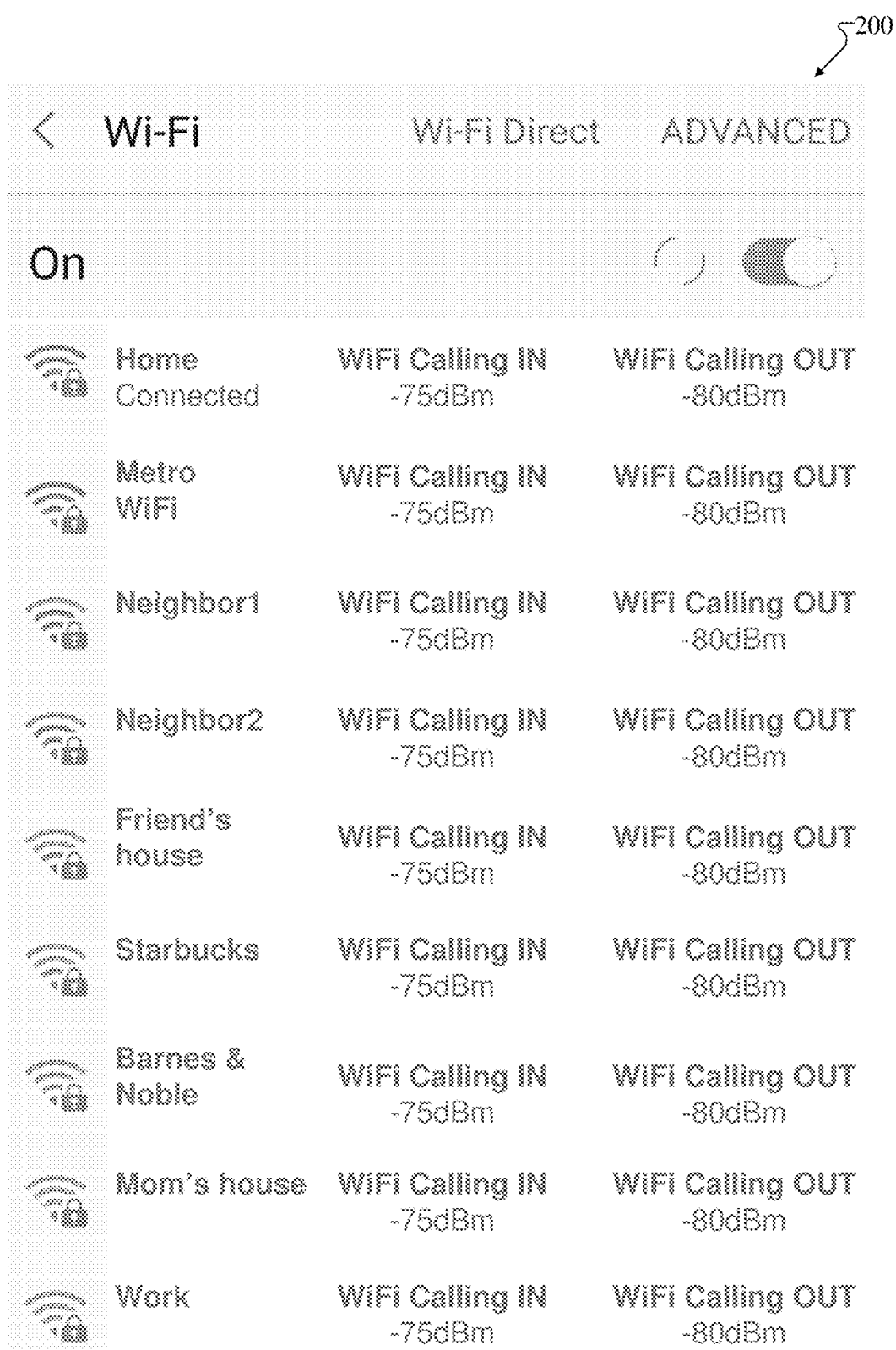
FIG. 2 illustrates an example schematic system block diagram of a Wi-Fi access point list with initial default thresholds according to one or more embodiments.

Referring now to FIG. 2, illustrated is an example schematic system block diagram of a Wi-Fi access point list with initial default thresholds according to one or more embodiments. FIG. 2 depicts an example screen capture of a UE 102. The screen capture can show a Wi-Fi AP list 200 associated with where the UE 102 has encountered a Wi-Fi AP (e.g., home, friend's house, work, etc.). Additionally, the thresholds for joining and releasing each Wi-Fi AP can be listed for each of the Wi-Fi APs.

Figure 3:
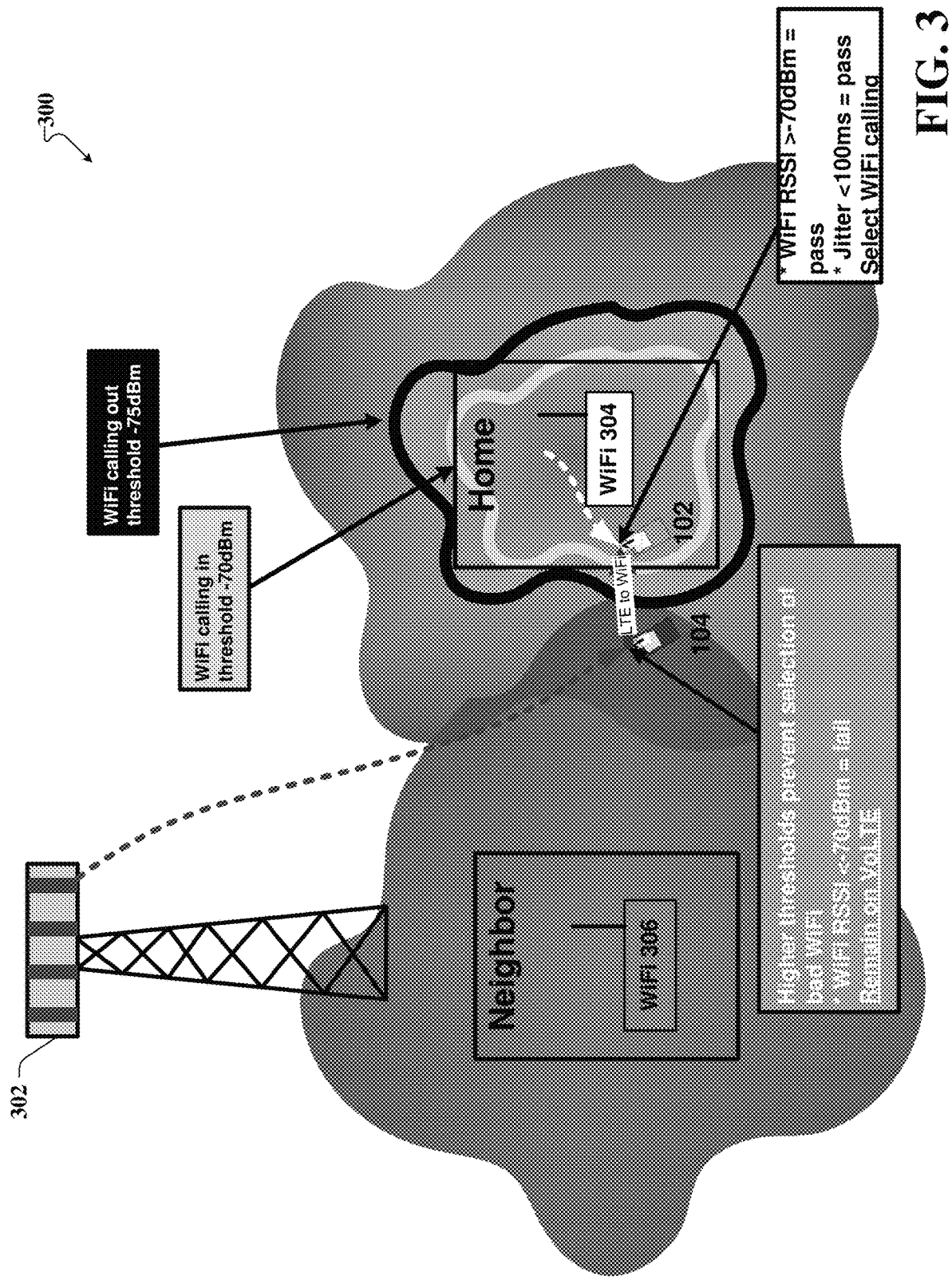
FIG. 3 illustrates an example schematic system block diagram of an incoming Wi-Fi calling selection scenario with adjusted thresholds according to one or more embodiments.

Referring now to FIG. 3, illustrated is an example schematic system block diagram of an incoming Wi-Fi calling selection scenario with adjusted thresholds according to one or more embodiments. As depicted by FIG. 3, the UE 104, of the wireless network 300, can remain in communication with a base station device 302, as it travels, due to higher thresholds that prevent the UE 104 from selecting a bad Wi-Fi device 306. For example, if the received signal strength indication (RSSI) for the UE 104 is less than −70 dBm, then the connection to the Wi-Fi device 306, 304 can fail and the UE 104 will remain in communication with the base station device 302. Alternatively, the UE 102 is depicted as within the threshold of the Wi-Fi device 304 and therefore leverages the Wi-Fi device 304 for communication rather than the base station device 302. Thus, for a Wi-Fi RSSI of greater than −70 dBm, the UE 102 can connect to the Wi-Fi device 304 because the jitter is less than 100 ms, but if the UE 102 were to relocate and the Wi-Fi RSSI becomes less than −75 dBm, then the UE 102 can switch back to communication with the base station device 302 due to the jitter increase outside of the threshold value of −75 dBm.

Figure 4:
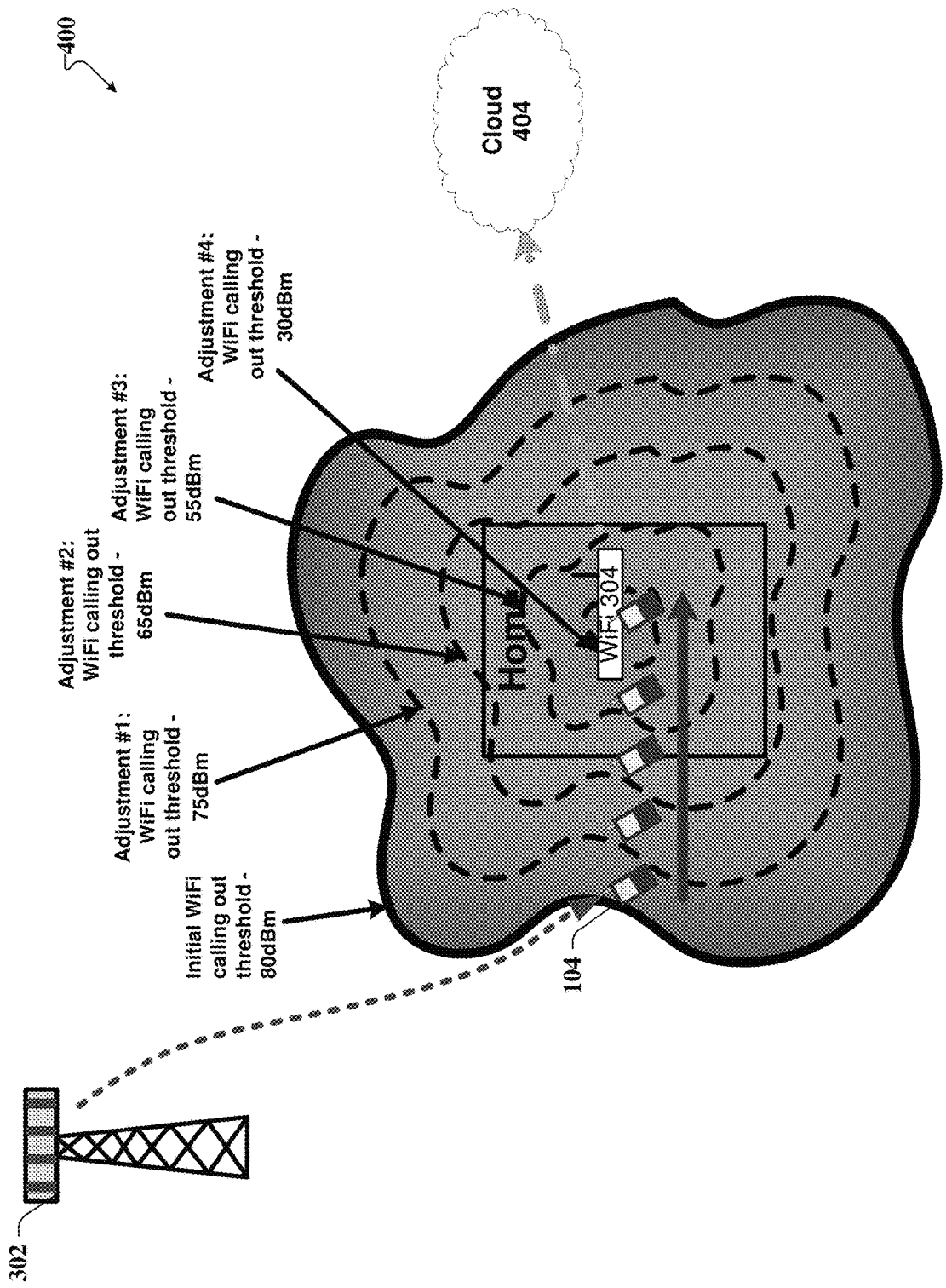
FIG. 4 illustrates an example schematic system block diagram of an incoming Wi-Fi calling selection scenario with overload or transport jitter according to one or more embodiments.

Referring now to FIG. 4, illustrated is an example schematic system block diagram of an incoming Wi-Fi calling selection scenario with overload or transport jitter according to one or more embodiments. As depicted by FIG. 4, several adjustments can be made for the UE 104 as the UE 104 moves closer to the Wi-Fi device 304. For instance, in this embodiment, if the Wi-Fi RSSI is above the threshold value and yet the jitter is above another threshold value, then the jitter threshold value can be increased to compensate for the jitter. Therefore, although, under normal circumstances, the Wi-Fi device 304 would be selected by the UE 104 for communication, an increased jitter value can cause the UE 104 to adaptively increase the threshold value to mitigate the jitter. Thus, successive attempts by the UE 104 to communicate via the Wi-Fi device 304, which has experienced jitter failures, can result in an increased Wi-Fi calling RSSI threshold. Consequently, Wi-Fi calling will be disabled by the system 400 and the UE 104 can leverage the base station device 302 for voice calls. Additionally, all of the threshold data, jitter data, UE 104 data, and Wi-Fi device 304 data can be stored in a cloud-based server associated with a cloud 404 for later use as indicated below.

Figure 5:
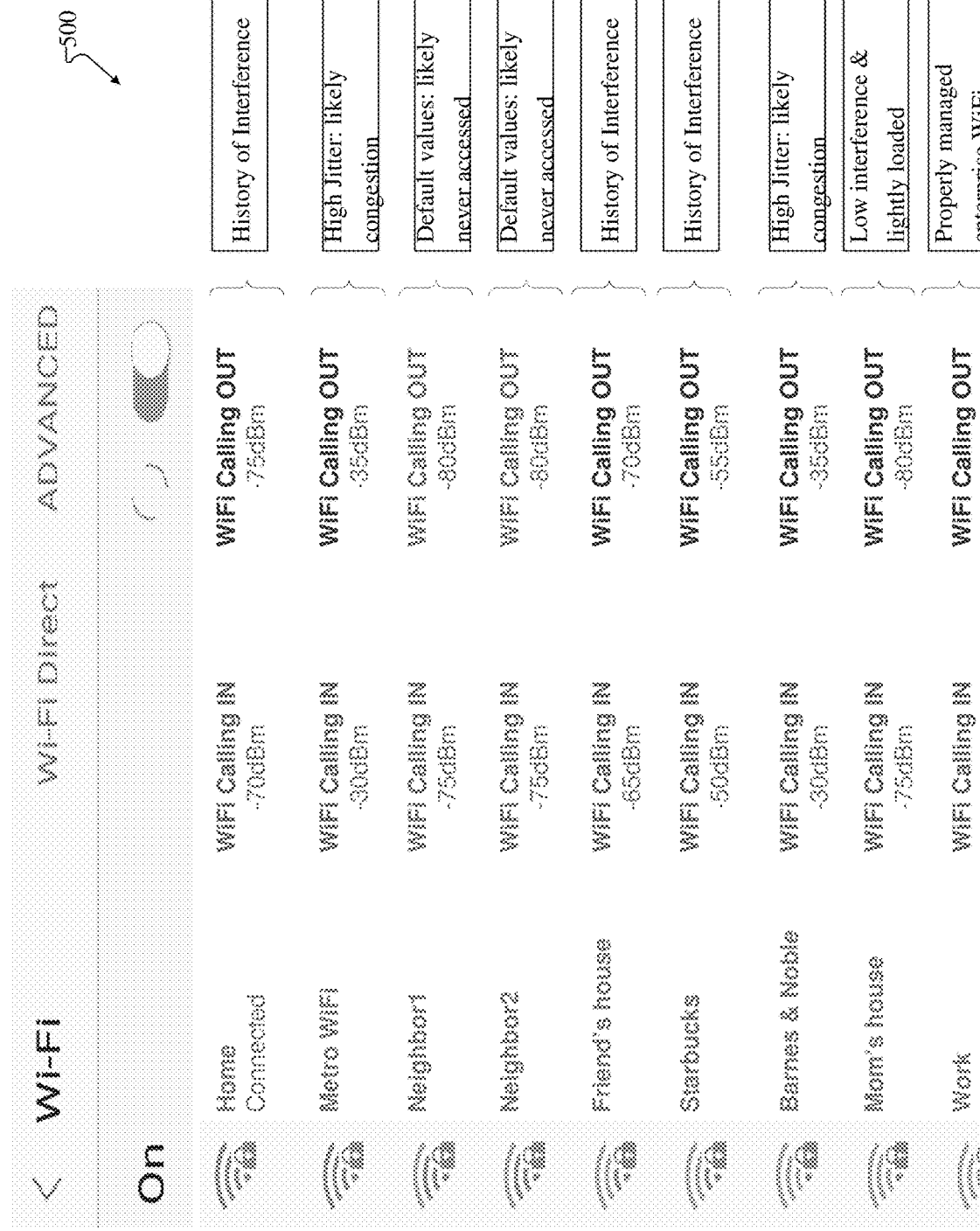
FIG. 5 illustrates an example schematic system block diagram of a Wi-Fi access point list with self-optimized thresholds according to one or more embodiments.

Referring now to FIGS. 5 and 6, illustrated is an example schematic system block diagram of a Wi-Fi access point list with self-optimized thresholds according to one or more embodiments, and an example schematic system block diagram of expanded user equipment Wi-Fi access point list with self-optimized thresholds according to one or more embodiments. FIG. 5 depicts an example screen capture of a UE 102. The screen capture can show a Wi-Fi AP list 500 associated with where the UE 102 has encountered a Wi-Fi AP (e.g., home, friend's house, work, etc.). Additionally, the thresholds for joining and releasing each Wi-Fi AP can be listed for each of the Wi-Fi APs, thus allowing the UE 102 to self-optimize based on the Wi-Fi AP history and varying quality thresholds associated with each Wi-Fi AP. For instance, the "Home" Wi-Fi AP can list threshold values of −70 dBm (calling in) to −75 dBm (calling out), which can indicate some history of interference and/or jitter. The "Metro" Wi-Fi AP can list threshold values of −30 dBm (calling in) to −35 dBm (calling out), which can indicate (based on the small threshold gap of −5 dBm) high jitter from likely congestion and/or interference. In some cases, as with the "Neighbor 1" Wi-Fi AP the threshold values can be between −75 dBm (calling in) to −80 dBm (calling out), which can be a default threshold indicative of the "Neighbor 1" Wi-Fi AP never being accessed. In other cases, as with the "Mom's house" Wi-Fi AP the threshold values can be between −75 dBm (calling in) to −80 dBm (calling out), and can indicate a low interference and/or a light network load associated with the "Mom's house" Wi-Fi AP. With reference to FIG. 6, the Wi-Fi AP list 600 can build upon the Wi-Fi AP list 500 by adding media access control (MAC) address data, location data, and/or threshold expiration data to the Wi-Fi AP list.

Figure 7:
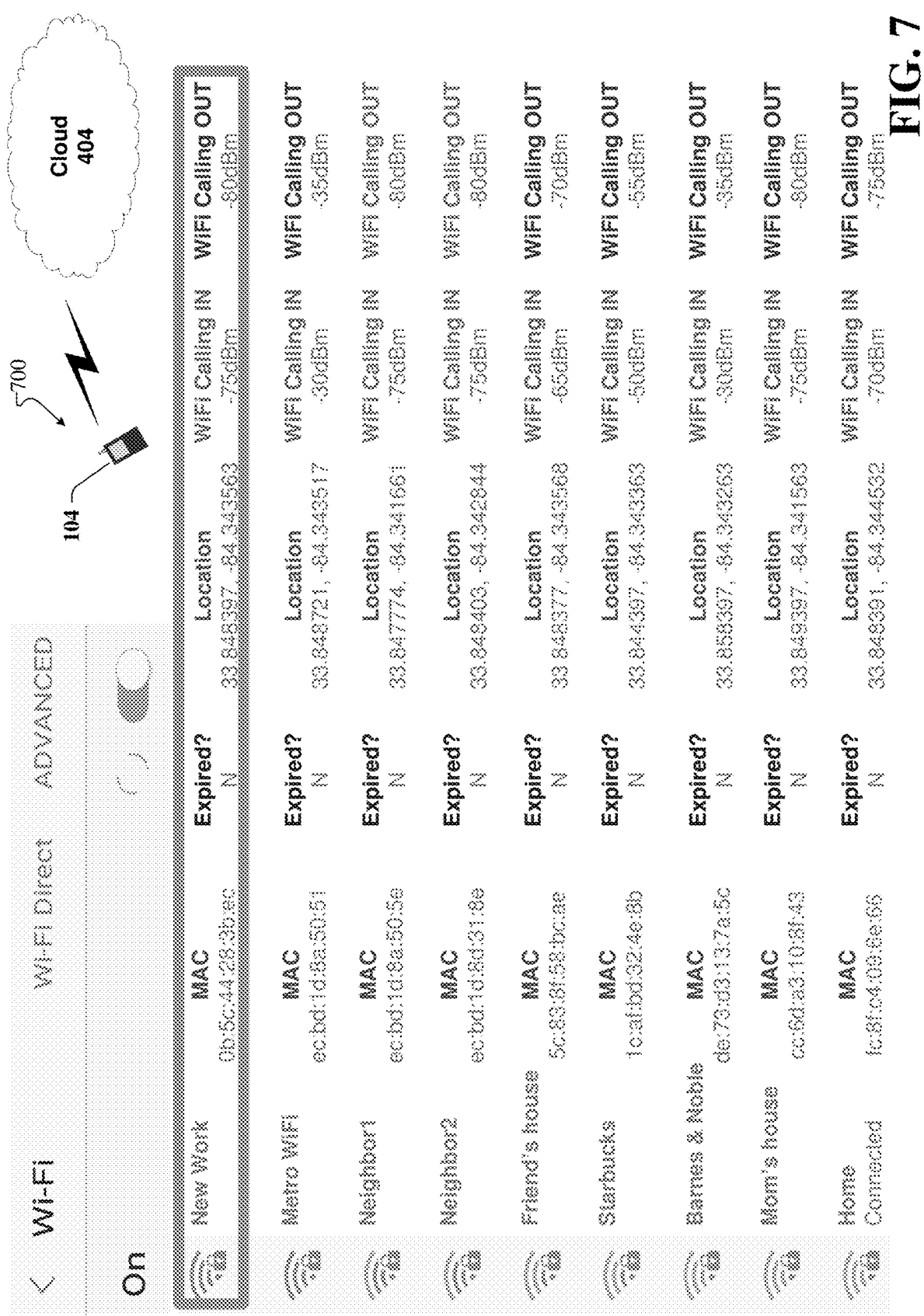
FIG. 7 illustrates an example schematic system block diagram of a user equipment upload of initial access point threshold information to an access point database according to one or more embodiments.

Referring now to FIGS. 7 and 8, illustrated is an example schematic system block diagram of a user equipment upload of initial access point threshold information to an access point database according to one or more embodiments. Although the Wi-Fi AP list 700 can be stored internally to the UE 104, it can also be sent to a cloud 404 via a cloud-computing device (e.g., server) to be stored for use and access by other UEs or the same UE 104 at a later time. For example, data (e.g., threshold data, self-optimization data, SSID data, MAC data, location data, service specific data, etc.) associated with a newly detected AP such as the "New Work" Wi-Fi AP device can be sent to the cloud 404 and stored as Wi-Fi AP list 800 there. Additional information such as the age of the data can be sent from the UE 104 and/or generated at the cloud and updated according to a timeline (e.g., days, weeks, months, etc.).

Figure 9:
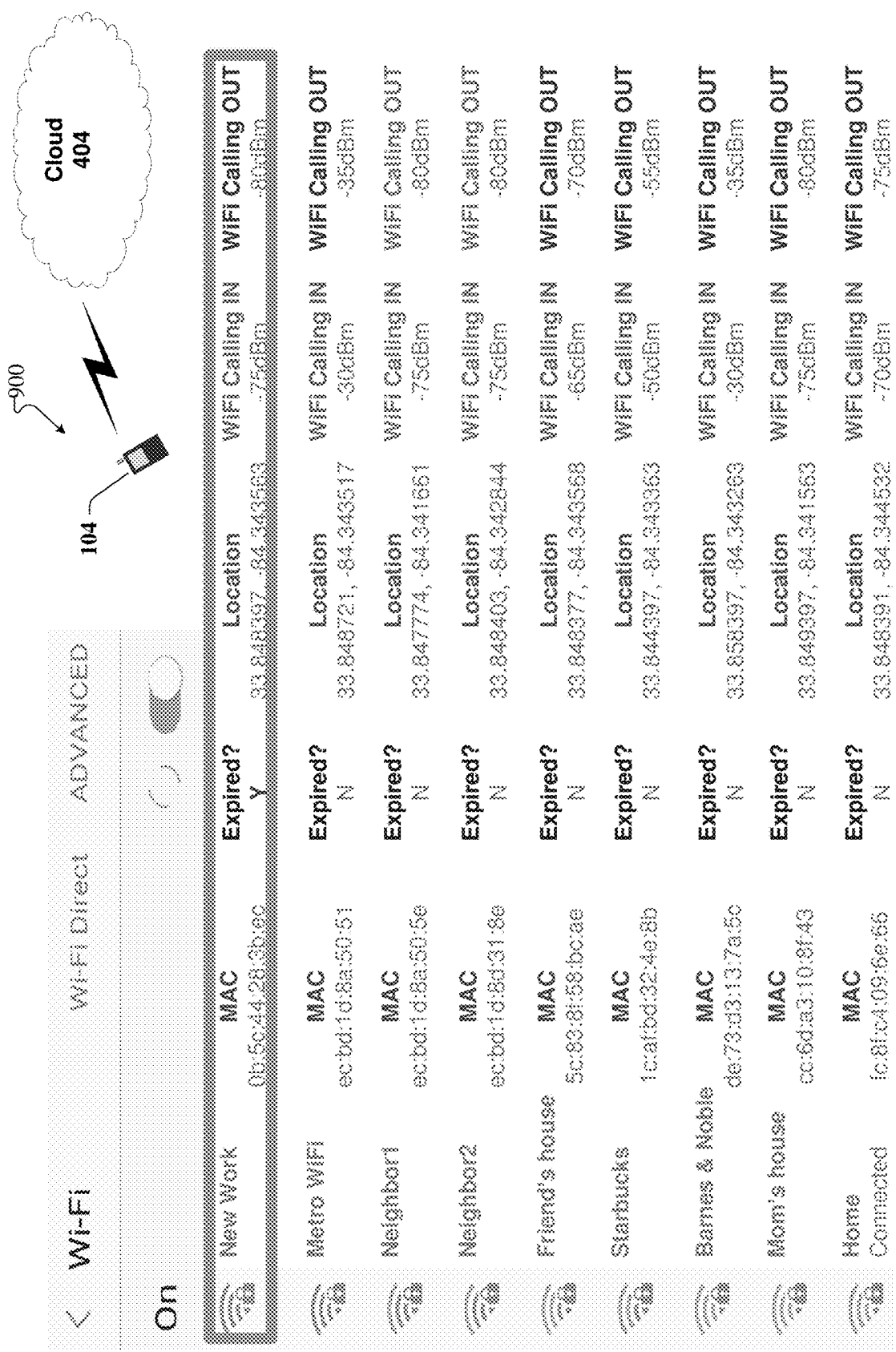
FIG. 9 illustrates an example schematic system block diagram of a user equipment refresh and replace of expired access point threshold information to an access point database according to one or more embodiments.
Figure 10:
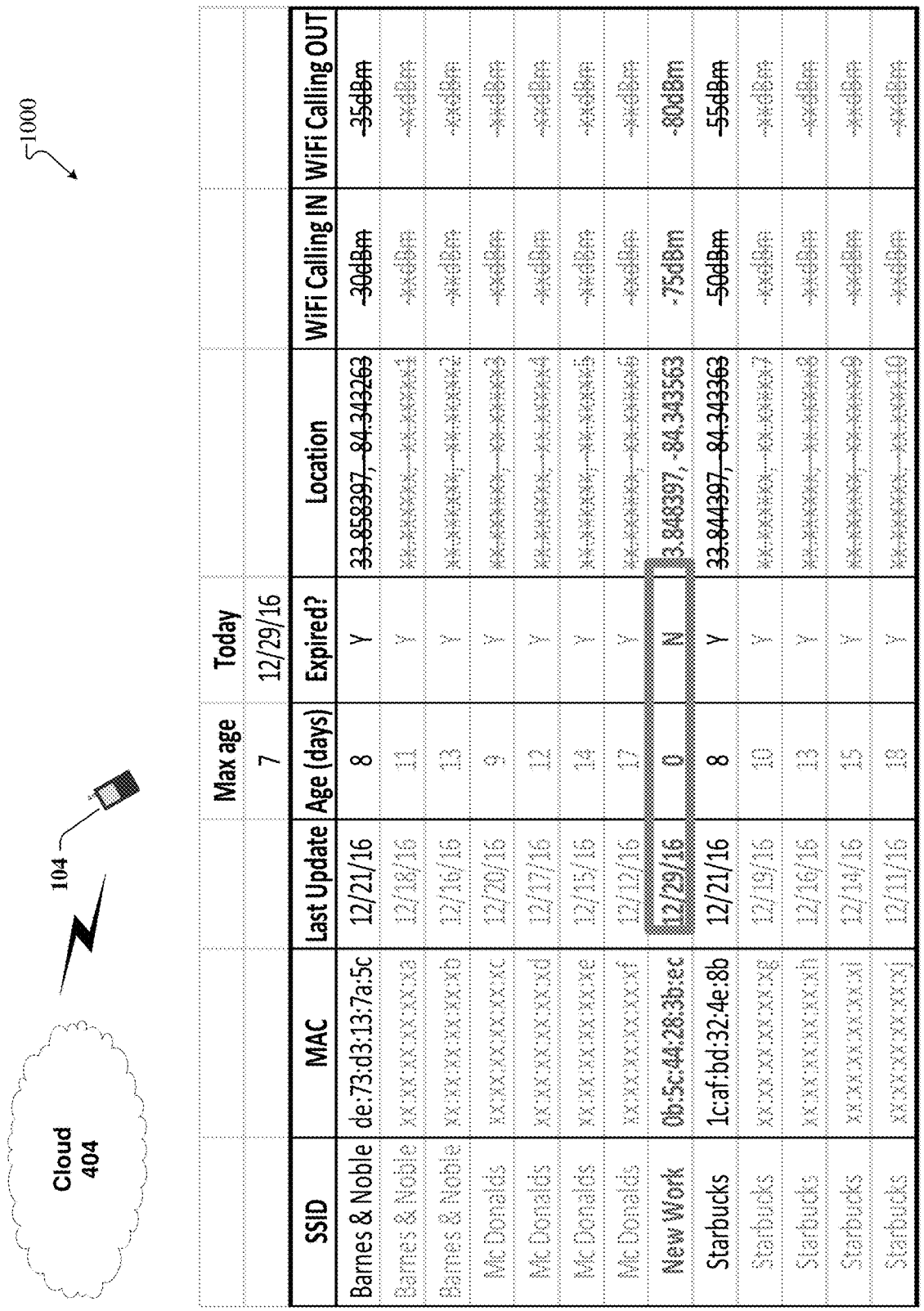
FIG. 10 illustrates an example schematic system block diagram of a user equipment refresh and replace of expired access point threshold information to an access point database according to one or more embodiments.

Referring now to FIGS. 9 and 10, illustrates an example schematic system block diagram of a user equipment refresh and replace of expired access point threshold information to an access point database according to one or more embodiments. In other embodiments, after the "New Work" Wi-Fi AP threshold value data becomes stale due to time expiration as shown by the Wi-Fi AP list 900, the UE 104 can refresh and/or replace the "New Work" Wi-Fi AP information by collecting a new set of jitter measurements and recalculating the thresholds. The refresh and/or replace data comprising the recalculated thresholds can be communicated to the cloud 404 and updated in the Wi-Fi AP list 1000.

Figure 11:
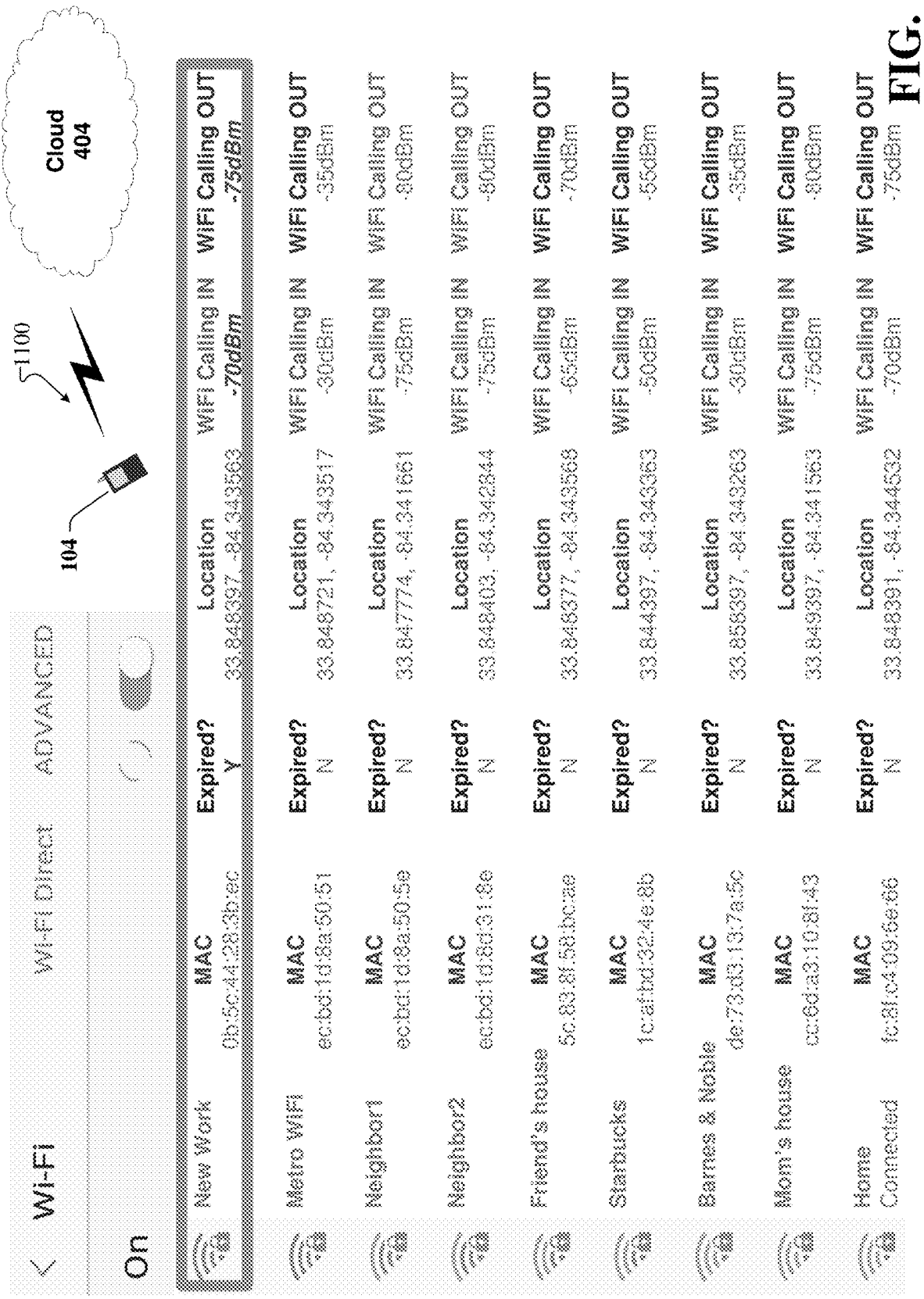
FIG. 11 illustrates an example schematic system block diagram of a user equipment refresh and replace access point threshold information after a quality failure according to one or more embodiments.
Figure 12:
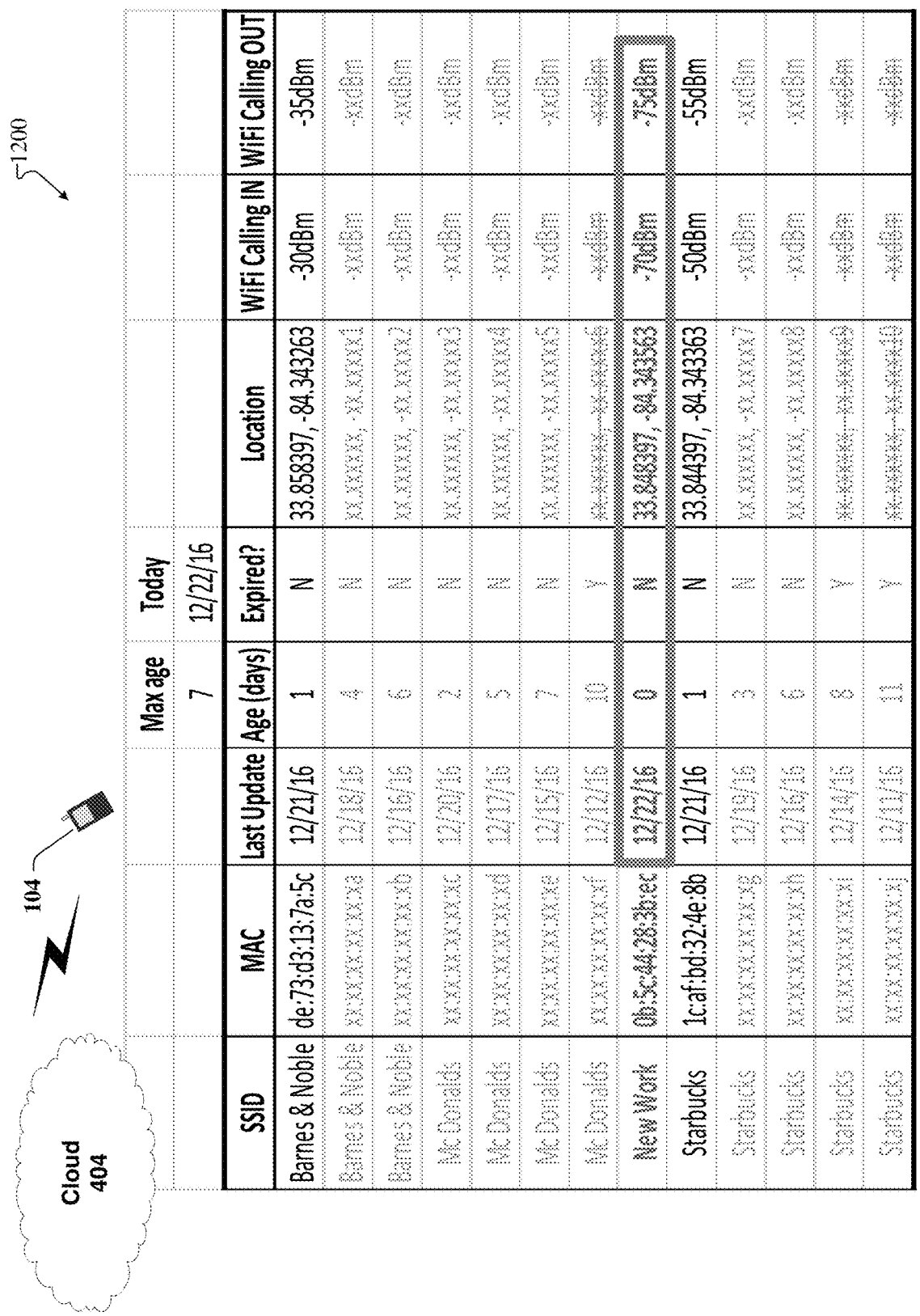
FIG. 12 illustrates an example schematic system block diagram of a user equipment refresh and replace access point threshold information after a quality failure according to one or more embodiments.

Referring now to FIGS. 11 and 12, illustrated is an example schematic system block diagram of a user equipment refresh and replace access point threshold information after a quality failure according to one or more embodiments. Upon the UE 104 detecting a quality failure (e.g., high jitter and poor voice quality) during a Wi-Fi call, the UE 104 can mark the Wi-Fi AP thresholds as expired, and take a new set of jitter measurements to recalculate the thresholds for the Wi-Fi AP. The refresh and/or replace data comprising the recalculated thresholds can be communicated to the cloud 404 and updated in the Wi-Fi AP list 1000.

Figure 14:
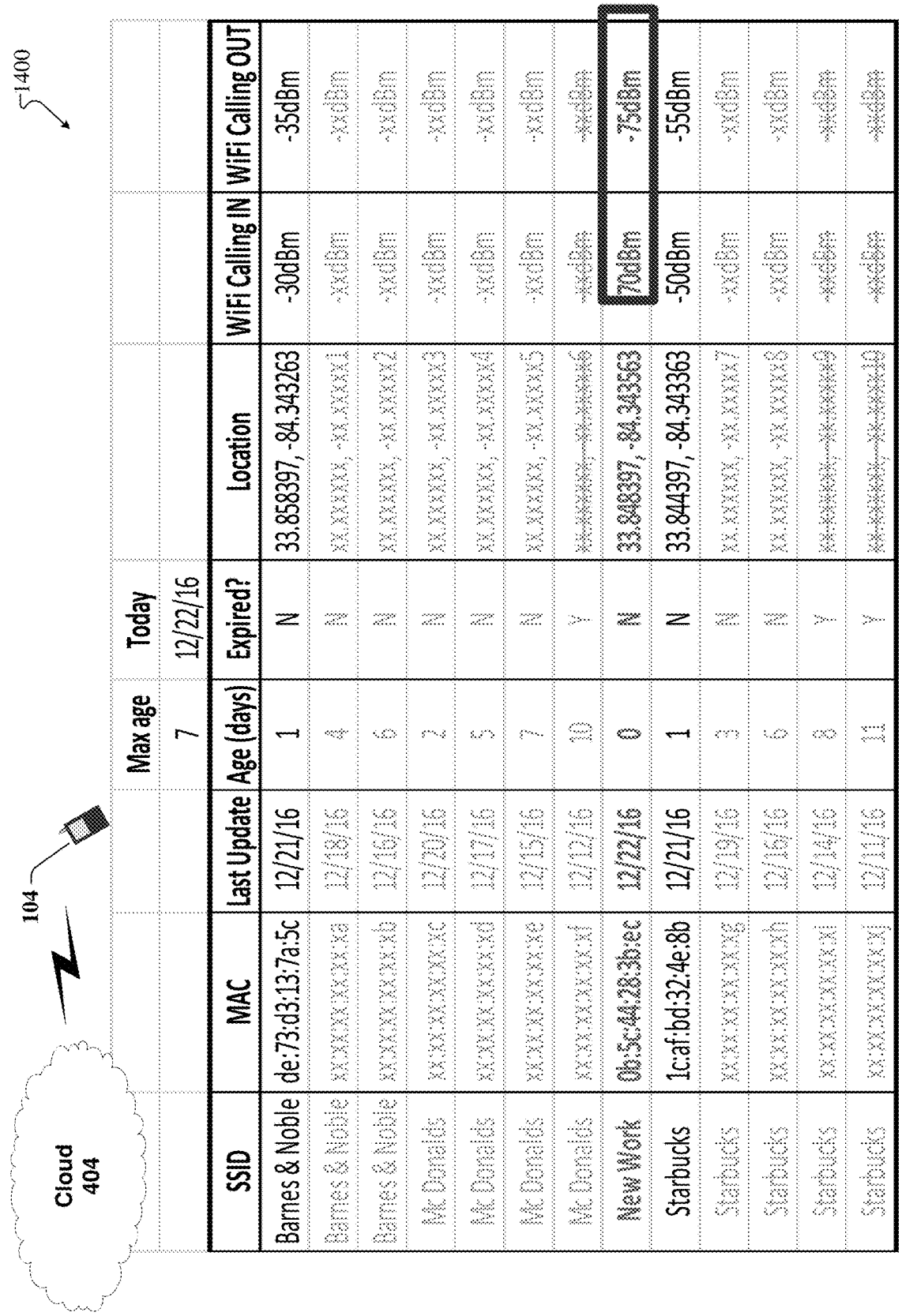
FIG. 14 illustrates an example schematic system block diagram for a user equipment to obtain crowd-sourced AP thresholds from a cloud access point database according to one or more embodiments.

Referring now to FIGS. 13 and 14, illustrated is an example schematic system block diagram for a user equipment to obtain crowd-sourced AP thresholds from a cloud access point database according to one or more embodiments. When the UE 104 detects a new Wi-Fi AP 304, for which Wi-Fi calling in and out thresholds are not yet known (see Wi-Fi AP list 1300), the UE 104 can send a Wi-Fi AP SSID and MAC address along with a request for the Wi-Fi AP thresholds associated with the Wi-Fi AP 304. The Wi-Fi AP thresholds can be crowd-sourced from other UEs 102 that have visited the Wi-Fi AP 304 previously. The AP cloud-based platform can then return the Wi-Fi in and out thresholds (see Wi-Fi AP list 1400) for the Wi-Fi AP 304 to the UE 104. After the AP cloud-based platform has returned the Wi-Fi in and out thresholds, the UE 104 can update its internal Wi-Fi AP list 1300 with the correct data (e.g., expired status, Wi-Fi calling thresholds, etc.).

Figure 15:
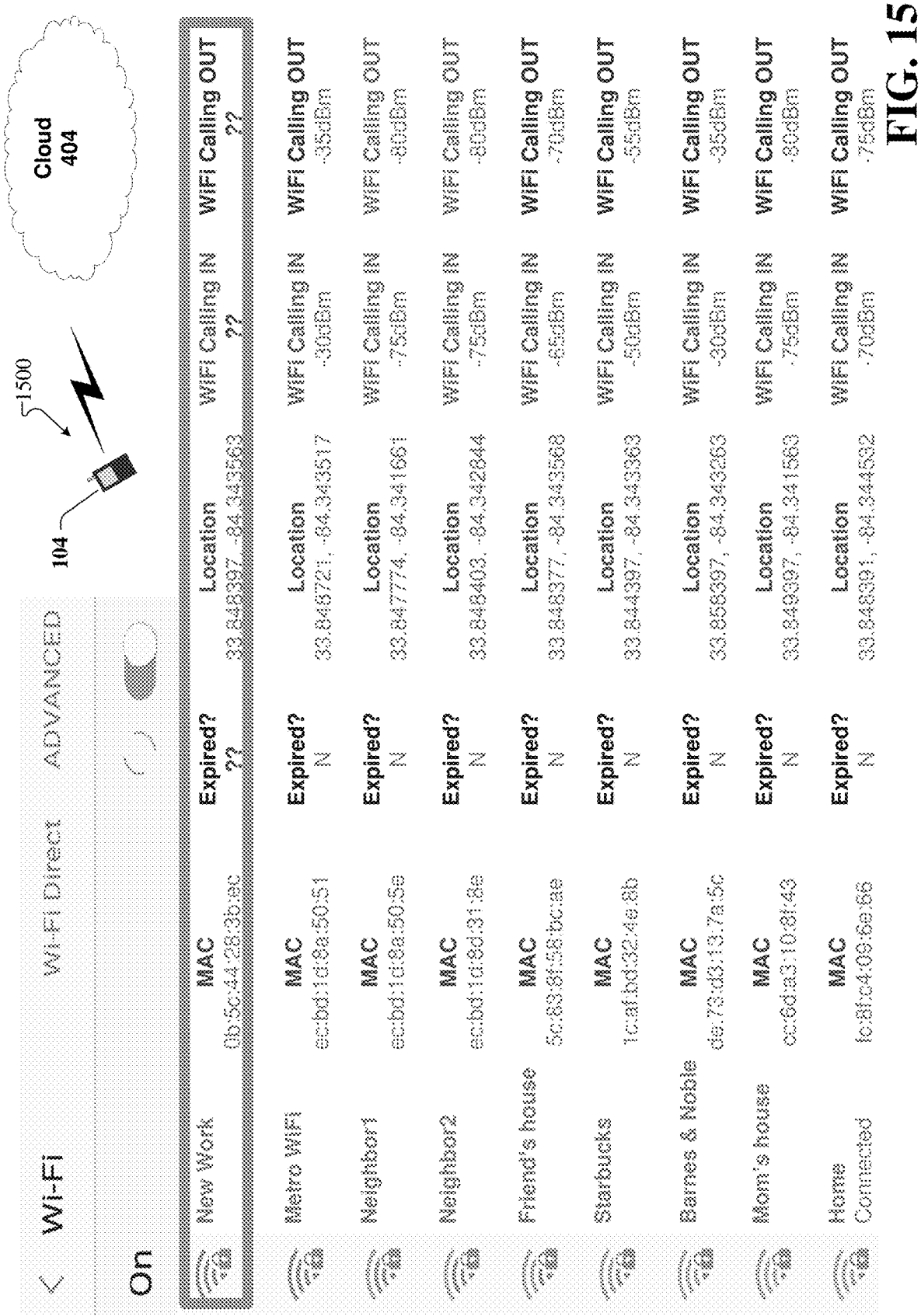
FIG. 15 illustrates an example schematic system block diagram for user equipment to obtain crowd-sourced access point thresholds from a cloud access point database according to one or more embodiments.
Figure 16:
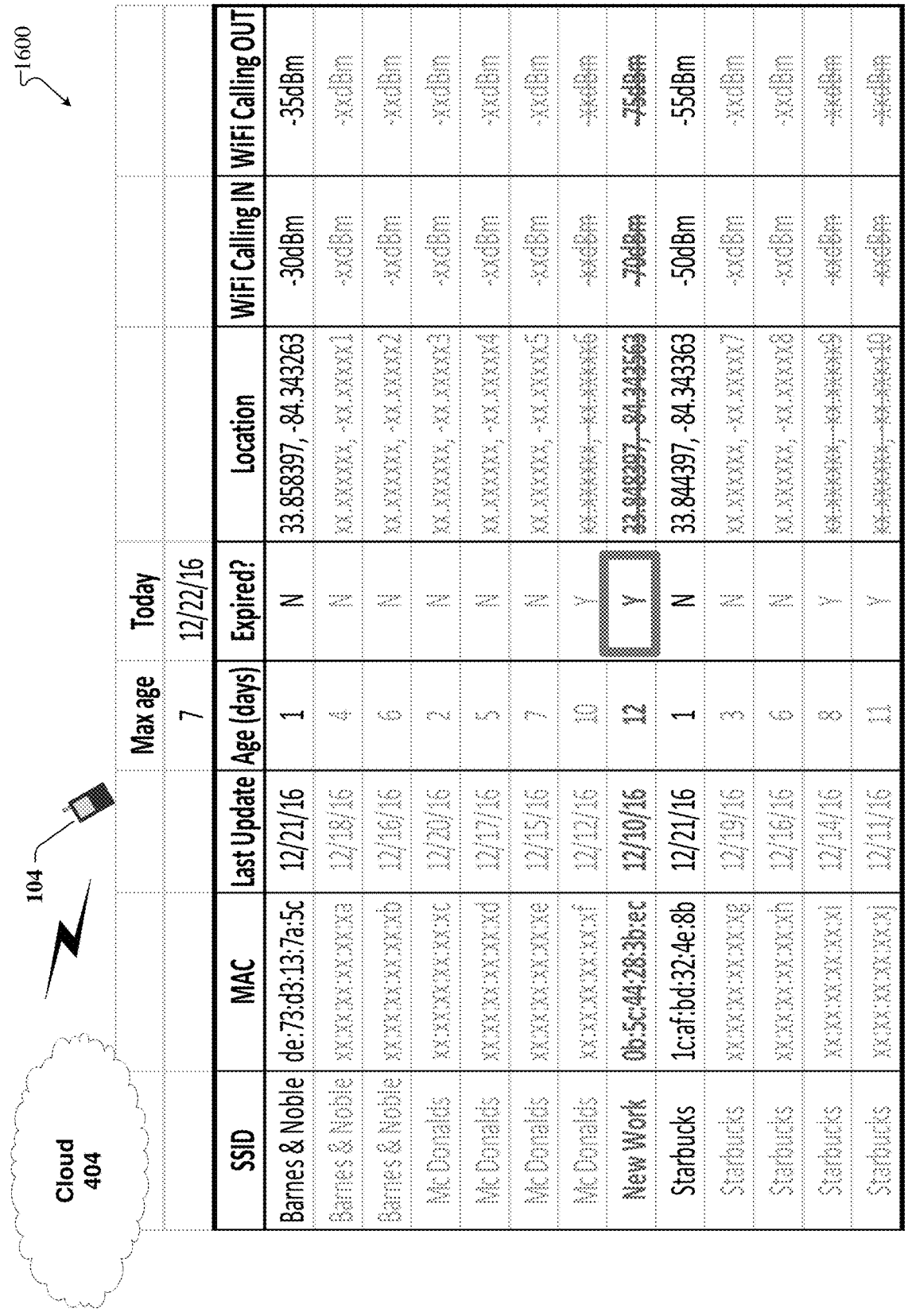
FIG. 16 illustrates an example schematic system block diagram for user equipment to obtain crowd-sourced access point thresholds from a cloud access point database according to one or more embodiments.

Referring now to FIGS. 15 and 16, illustrated is an example schematic system block diagram for user equipment to obtain crowd-sourced access point thresholds from a cloud access point database according to one or more embodiments. In yet another embodiment, when the threshold data has expired at the cloud-based platform, and the UE 104 can detect a new Wi-Fi AP 304, for which Wi-Fi calling in and out thresholds are not yet known (see Wi-Fi AP list 1500). The UE 104 can send a Wi-Fi AP SSID and MAC address along with a request for the Wi-Fi AP thresholds associated with Wi-Fi AP 304 to the cloud-based platform. However, if the Wi-Fi AP thresholds are not contained in the Wi-Fi AP list 1600, then the AP cloud-based platform can then return a request for a threshold update to be performed by the UE 104.

Figure 17:
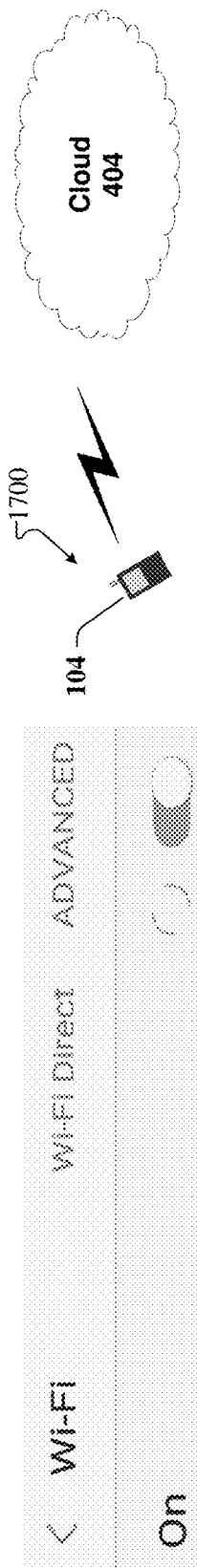
FIG. 17 illustrates an example schematic system block diagram for user equipment to obtain crowd-sourced access point thresholds from a cloud access point database.

Referring now to FIGS. 17 and 18, illustrated is an example schematic system block diagram for user equipment to obtain crowd-sourced access point thresholds from a cloud access point database according to one or more embodiments. In yet another embodiment, when the threshold data has expired at the cloud-based platform, and the UE 104 detects a new Wi-Fi AP 304, for which Wi-Fi calling in and out thresholds are not yet known (see Wi-Fi AP list 1700), the UE 104 can send a Wi-Fi AP SSID and MAC address along with a request for the Wi-Fi AP thresholds associated with Wi-Fi AP 304 to the cloud-based platform. However, if the Wi-Fi AP thresholds are not contained in the Wi-Fi AP list 1800, then the AP cloud-based platform can then return a request for a threshold update to be performed by the UE 104. After the AP cloud-based platform has returned the request, the UE 104 can perform jitter and threshold measurements and update its internal Wi-Fi AP list 1700 and send its updated internal Wi-Fi AP list 1700 to be stored at the external cloud-based Wi-Fi AP list 1800. This process can refresh expired data at both the UE 104 and the server device for the cloud 404.

Referring now to FIG. 19, illustrated is an example schematic system block diagram of an expanded user equipment Wi-Fi access point list with frequency information according to one or more embodiments. In another embodiment, the UE 104 screen can display frequency and/or band information associated with each Wi-Fi AP within the internal Wi-Fi AP list 1900. Collecting the frequency and/or band information can assist in facilitating automatic frequency selection within a SON.

Figure 21:
FIG. 21 illustrates an example schematic system block diagram for user equipment to upload initial access point frequency and threshold information to an access point database according to one or more embodiments.

Referring now to FIGS. 20 and 21, illustrated is an example schematic system block diagram for user equipment to upload initial access point frequency and threshold information to an access point database according to one or more embodiments. In yet another embodiment, when the UE 104 detects a new Wi-Fi AP 304, the UE 104 can self-optimize its thresholds associated with the Wi-Fi AP 304. The UE 104 can then send the Wi-Fi information (e.g., SSID, MAC address, band, channel, location, service provider identity, thresholds, etc.) to the cloud 404 where the Wi-Fi information can be stored in a data structure associated with the Wi-Fi AP list 2100. Consequently, the new Wi-Fi AP 304 can be added to the Wi-Fi AP list 2100 and used to optimize the network for future communications with one or more UEs.

Referring now to FIG. 22, illustrated is an example schematic system block diagram of a controlled and an uncontrolled access point status in the central access point database according to one or more embodiments. FIG. 22 depicts controlled and uncontrolled APs listed in the Wi-Fi AP list 2200. The service provider of controlled APs can change optimization parameters (e.g., Wi-Fi channel) for the APs. However, for uncontrolled APs, these parameters are not configure-able. The ability or inability to change an AP frequency or other parameters is a key dependency for SON tools. Thus, the cloud AP database server can check and add "controlled" status to the AP database for each SSID plus MAC combination. As seen on FIG. 22, the newly added Wi-Fi AP "New Work" from FIGS. 20 and 21 have been labeled as a controlled W-Fi APs. Each SSID plus MAC combination can be checked against a service provider hosted AP database. After checking the host state, the cloud AP database server can update the controlled status for each SSID plus MAC combination in the centralized AP database.

Referring now to FIG. 23, illustrated is an example schematic system block diagram for identifying problematic access points according to one or more embodiments. In a further embodiment, VoWiFi thresholds can increase until jitter is measured to be less than 100 ms for the specific AP. However, when Wi-Fi interference is the most significant cause for jitter being greater than 100 ms, high service thresholds (as shown by Wi-Fi AP list 2300) can be an indication of high interference and therefore a problematic AP. Consequently, the UE may be closer to the problematic AP (and further from the interference) before is it possible for the UE 104 to receive voice packets with greater 100 ms of jitter. High service thresholds can be an indicator of a problematic AP, which can benefit from automated SON.

Referring now to FIG. 24, illustrated is an example schematic system block diagram for identifying problematic access point pairs according to one or more embodiments. The interference to one AP can be from another nearby AP. In many cases, both nearby APs use the same or overlapping adjacent frequencies. Thus, both nearby APs with the same or overlapping adjacent frequencies can both be experiencing some form of mutual interference. As seen in Wi-Fi AP list 2400, the cloud-based AP database server or an adjunct SON application can filter and sort the central AP list (with crowd-sourced data) as follows: 1) identify problematic APs with high threshold, 2) determine adjacent APs based on distance of problematic APs, 3) determine adjacent APs with the same and adjacent plus overlapping frequency as the problematic APs, 4) sort same-frequency adjacent APs by threshold, and 5) pair the top adjacent AP with the problematic AP, thus yielding the problematic AP pair.

Figure 25:
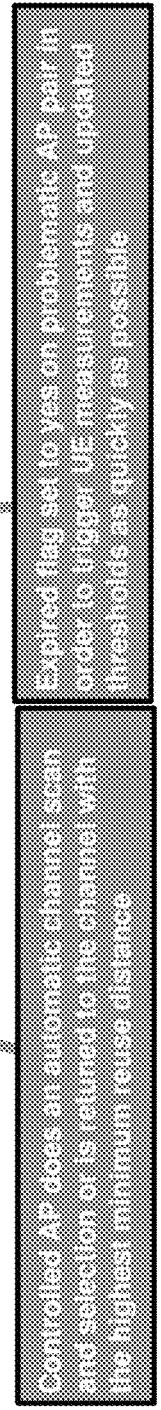
FIG. 25 illustrates an example schematic system block diagram of a controlled access point self-organizing network fix according to one or more embodiments.

Referring now to FIG. 25, illustrated is an example schematic system block diagram of a controlled access point self-organizing network fix according to one or more embodiments. Based on the information collected in reference to FIG. 24, the SON application can send a channel scan and selection request to the problematic AP, and that AP can respond with the new band and/or channel it has selected and applied. The SON application can then update the band and/or channel field in the central AP database and set the "expired" flag to "Y" for both APs in the problematic pair as shown in Wi-Fi AP list 2500. This will force the next UE to repeat jitter measurements and reset thresholds. Some problematic controlled APs may not support the automatic channel scan and selection method.

Figure 26:
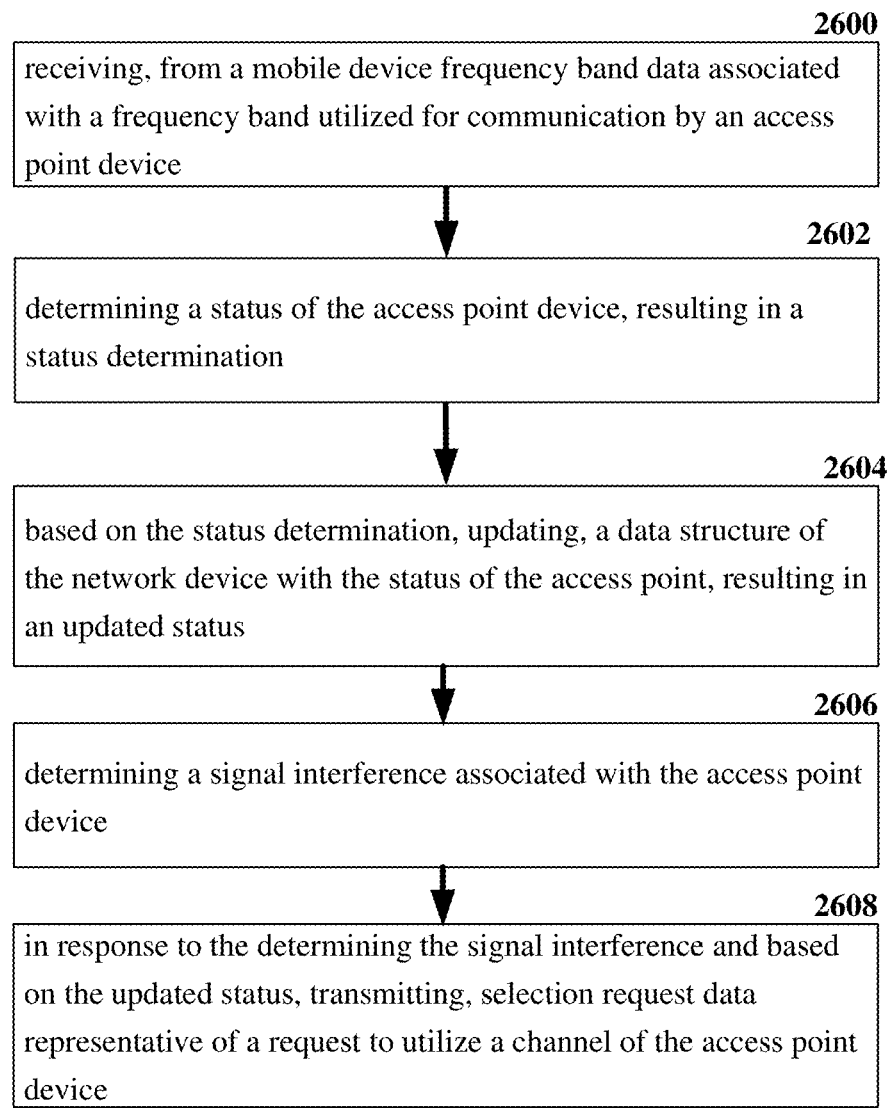
FIG. 26 illustrates an example flow diagram for a method for network planning based on crowd-sourced access point data for a 5G network according to one or more embodiments.

FIG. 26 illustrates an example flow diagram for a method for network planning based on crowd-sourced access point data for a 5G network according to one or more embodiments. At element 2600, the method can comprise receiving, from a mobile device 104 by a network device (e.g., cloud server device for cloud 404) comprising a processor, frequency band data associated with a frequency band utilized for communication by an access point device 304. At element 2602, the method can comprise determining, by the network device (e.g., cloud server device for cloud 404), a status of the access point device 304, resulting in a status determination. Based on the status determination, the method can comprise updating, by the network device (e.g., cloud server device for cloud 404), a data structure of the network device (e.g., cloud server device for cloud 404) with the status of the access point 304, resulting in an updated status at element 2604. Also, at element 2606, the method can comprise determining, by the network device (e.g., cloud server device for cloud 404), a signal interference associated with the access point device 304. In response to the determining the signal interference and based on the updated status, at element 2608 the method can comprise transmitting, by the network device (e.g., cloud server device for cloud 404), selection request data representative of a request to utilize a channel of the access point device 304.

Figure 27:
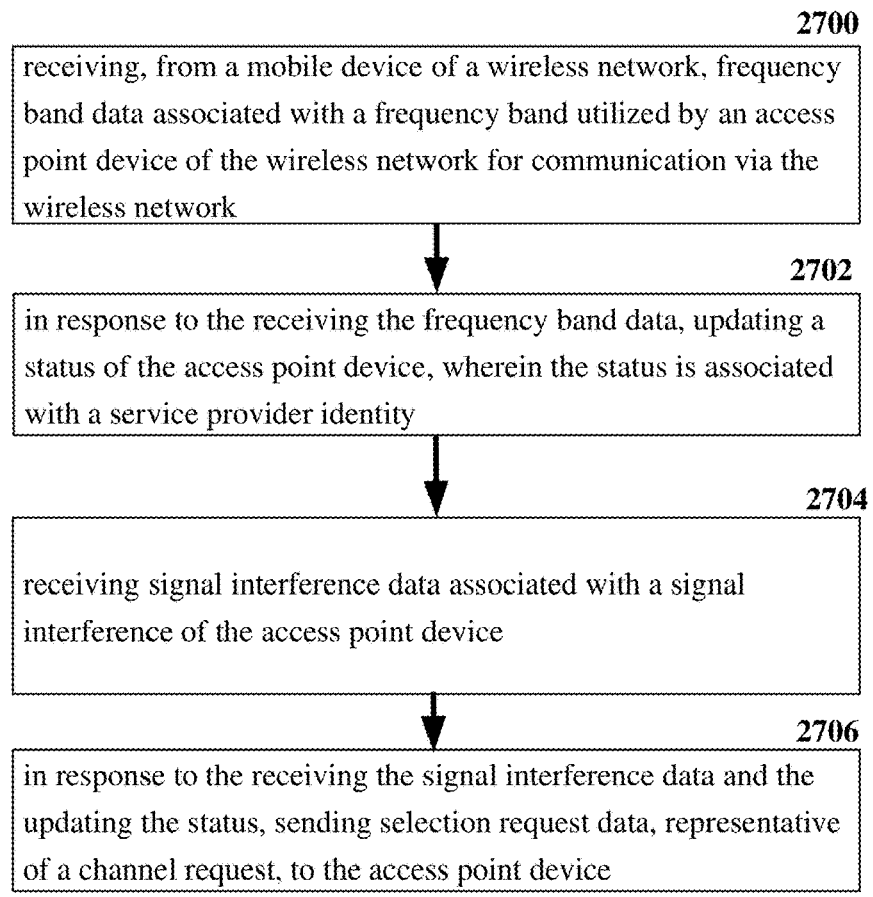
FIG. 27 illustrates an example flow diagram for a system for network planning based on crowd-sourced access point data for a 5G network according to one or more embodiments.

FIG. 27 illustrates an example flow diagram for a system for network planning based on crowd-sourced access point data for a 5G network according to one or more embodiments. At element 2700, the system can receive, from a mobile device 104 of a wireless network, frequency band data associated with a frequency band utilized by an access point device 304 of the wireless network for communication via the wireless network. At element 2702, in response to the receiving the frequency band data, updating (e.g., via a cloud server device for cloud 404) a status of the access point device 304, wherein the status is associated with a service provider identity. Furthermore, the system can receive signal interference data associated with a signal interference of the access point device 304 at element 2704, and in response to the receiving the signal interference data and the updating the status, the system can send selection request data (e.g., via the cloud server device for cloud 404), representative of a channel request, to the access point device 304 at element 2706.

Figure 28:
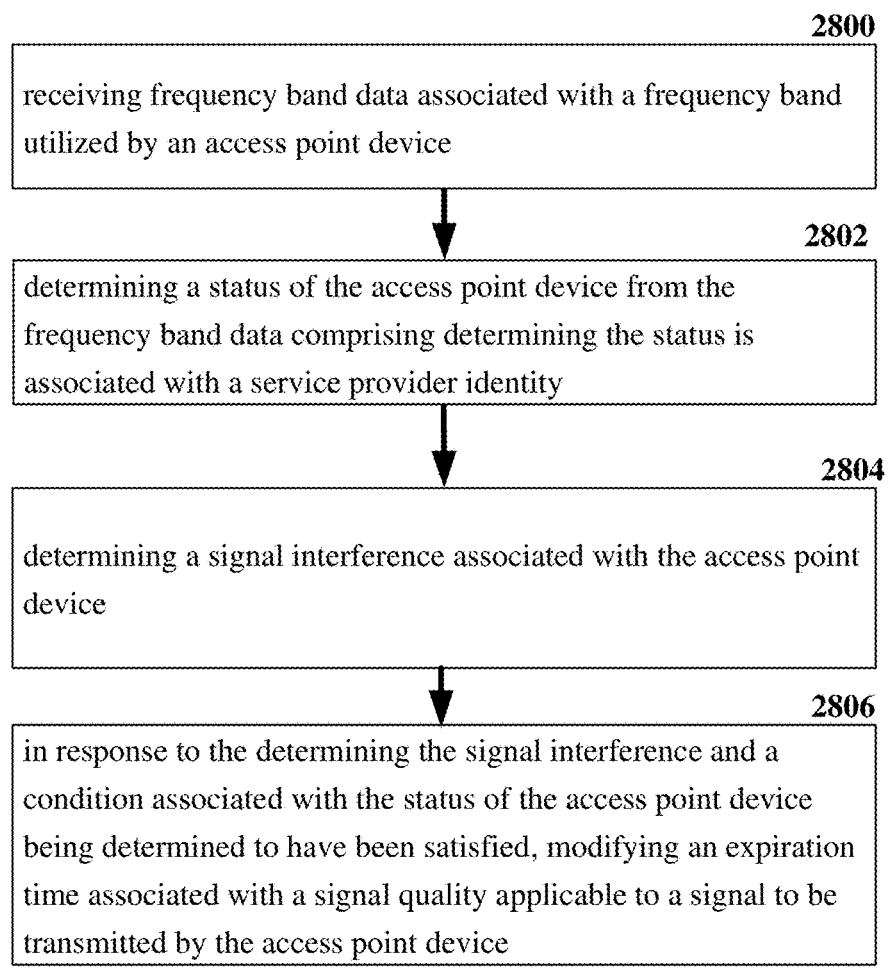
FIG. 28 illustrates an example flow diagram for a machine-readable medium for network planning based on crowd-sourced access point data for a 5G network according to one or more embodiments.

FIG. 28 illustrates an example flow diagram for a machine-readable medium for network planning based on crowd-sourced access point data for a 5G network according to one or more embodiments. At element 2800, the machine-readable medium can receive frequency band data associated with a frequency band utilized by an access point device 304. At element 2802, the machine-readable medium can determine a status of the access point device 304 from the frequency band data comprising determining the status is associated with a service provider identity. Additionally, at element 2804, the machine readable medium can determine a signal interference associated with the access point device 304, and in response to the determining the signal interference and a condition associated with the status of the access point device being determined to have been satisfied, the machine readable medium can modify an expiration time associated with a signal quality applicable to a signal to be transmitted by the access point device 304 at element 2806.

Figure 29:
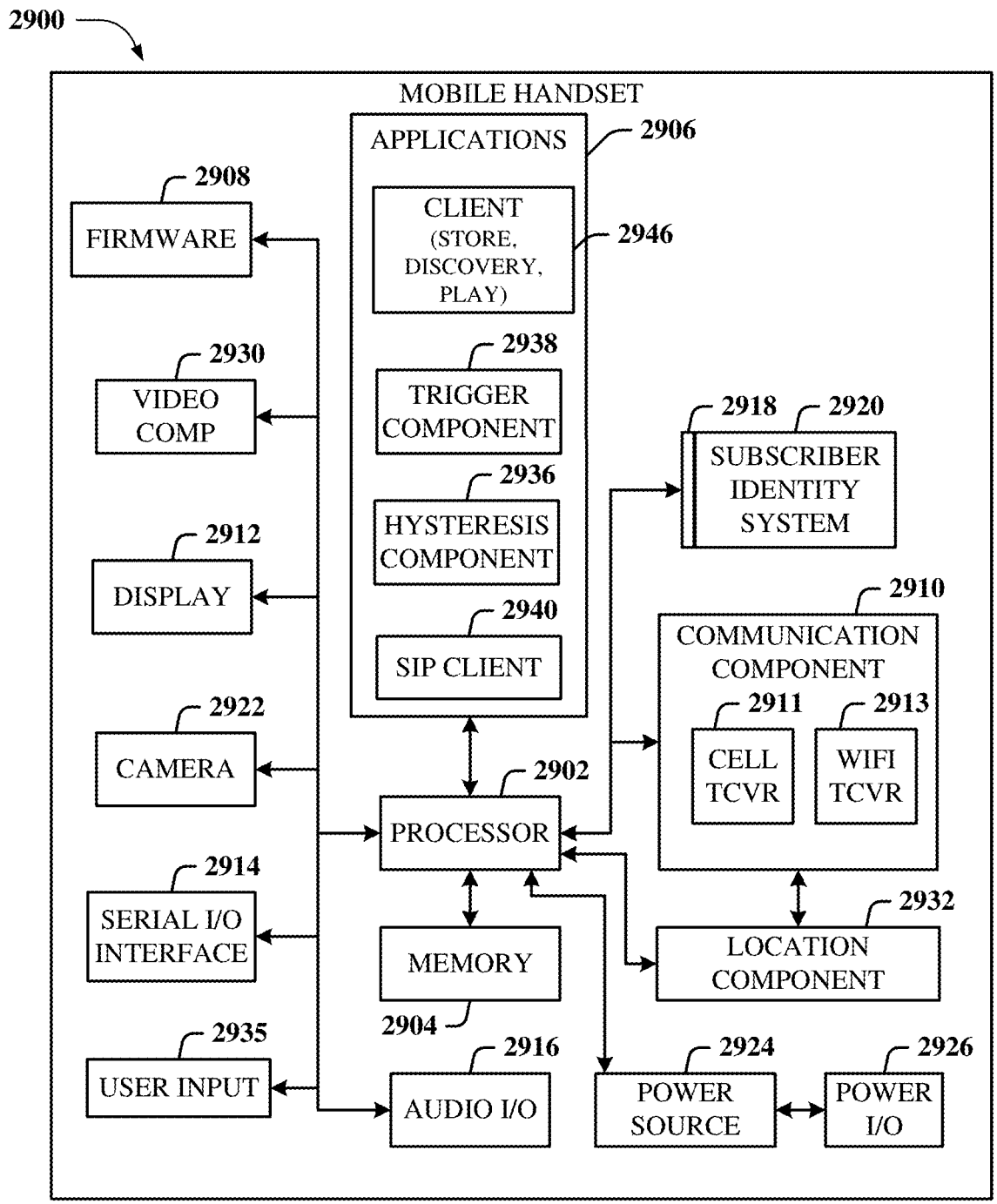
FIG. 29 illustrates an example block diagram of an example mobile handset operable to engage in a system architecture that facilitates secure wireless communication according to one or more embodiments described herein.

Referring now to FIG. 29, illustrated is a schematic block diagram of an exemplary end-user device such as a mobile device 2900 capable of connecting to a network in accordance with some embodiments described herein. Although a mobile handset 2900 is illustrated herein, it will be understood that other devices can be a mobile device, and that the mobile handset 2900 is merely illustrated to provide context for the embodiments of the various embodiments described herein. The following discussion is intended to provide a brief, general description of an example of a suitable environment 2900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 2900 includes a processor 2902 for controlling and processing all onboard operations and functions. A memory 2904 interfaces to the processor 2902 for storage of data and one or more applications 2906 (e.g., a video player software, user feedback component software, etc.). Other applications can include voice recognition of predetermined voice commands that facilitate initiation of the user feedback signals. The applications 2906 can be stored in the memory 2904 and/or in a firmware 2908, and executed by the processor 2902 from either or both the memory 2904 or/and the firmware 2908. The firmware 2908 can also store startup code for execution in initializing the handset 2900. A communications component 2910 interfaces to the processor 2902 to facilitate wired/wireless communication with external systems, e.g., cellular networks, VoIP networks, and so on. Here, the communications component 2910 can also include a suitable cellular transceiver 2911 (e.g., a GSM transceiver) and/or an unlicensed transceiver 2913 (e.g., Wi-Fi, WiMax) for corresponding signal communications. The handset 2900 can be a device such as a cellular telephone, a PDA with mobile communications capabilities, and messaging-centric devices. The communications component 2910 also facilitates communications reception from terrestrial radio networks (e.g., broadcast), digital satellite radio networks, and Internet-based radio services networks.

The handset 2900 includes a display 2912 for displaying text, images, video, telephony functions (e.g., a Caller ID function), setup functions, and for user input. For example, the display 2912 can also be referred to as a "screen" that can accommodate the presentation of multimedia content (e.g., music metadata, messages, wallpaper, graphics, etc.). The display 2912 can also display videos and can facilitate the generation, editing and sharing of video quotes. A serial I/O interface 2914 is provided in communication with the processor 2902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 2900, for example. Audio capabilities are provided with an audio I/O component 2916, which can include a speaker for the output of audio signals related to, for example, indication that the user pressed the proper key or key combination to initiate the user feedback signal. The audio I/O component 2916 also facilitates the input of audio signals through a microphone to record data and/or telephony voice data, and for inputting voice signals for telephone conversations.

The handset 2900 can include a slot interface 2918 for accommodating a SIC (Subscriber Identity Component) in the form factor of a card Subscriber Identity Module (SIM) or universal SIM 2920, and interfacing the SIM card 2920 with the processor 2902. However, it is to be appreciated that the SIM card 2920 can be manufactured into the handset 2900, and updated by downloading data and software.

The handset 2900 can process IP data traffic through the communication component 2910 to accommodate IP traffic from an IP network such as, for example, the Internet, a corporate intranet, a home network, a person area network, etc., through an ISP or broadband cable provider. Thus, VoIP traffic can be utilized by the handset 2900 and IP-based multimedia content can be received in either an encoded or decoded format.

A video processing component 2922 (e.g., a camera) can be provided for decoding encoded multimedia content. The video processing component 2922 can aid in facilitating the generation, editing and sharing of video quotes. The handset 2900 also includes a power source 2924 in the form of batteries and/or an AC power subsystem, which power source 2924 can interface to an external power system or charging equipment (not shown) by a power 110 component 2926.

The handset 2900 can also include a video component 2930 for processing video content received and, for recording and transmitting video content. For example, the video component 2930 can facilitate the generation, editing and sharing of video quotes. A location tracking component 2932 facilitates geographically locating the handset 2900. As described hereinabove, this can occur when the user initiates the feedback signal automatically or manually. A user input component 2934 facilitates the user initiating the quality feedback signal. The user input component 2934 can also facilitate the generation, editing and sharing of video quotes. The user input component 2934 can include such conventional input device technologies such as a keypad, keyboard, mouse, stylus pen, and/or touch screen, for example.

Referring again to the applications 2906, a hysteresis component 2936 facilitates the analysis and processing of hysteresis data, which is utilized to determine when to associate with the access point. A software trigger component 2938 can be provided that facilitates triggering of the hysteresis component 2938 when the Wi-Fi transceiver 2913 detects the beacon of the access point. A SIP client 2940 enables the handset 2900 to support SIP protocols and register the subscriber with the SIP registrar server. The applications 2906 can also include a client 2942 that provides at least the capability of discovery, play and store of multimedia content, for example, music.

The handset 2900, as indicated above related to the communications component 810, includes an indoor network radio transceiver 2913 (e.g., Wi-Fi transceiver). This function supports the indoor radio link, such as IEEE 802.11, for the dual-mode GSM handset 2900. The handset 2900 can accommodate at least satellite radio services through a handset that can combine wireless voice and digital radio chipsets into a single handheld device.

Figure 30:
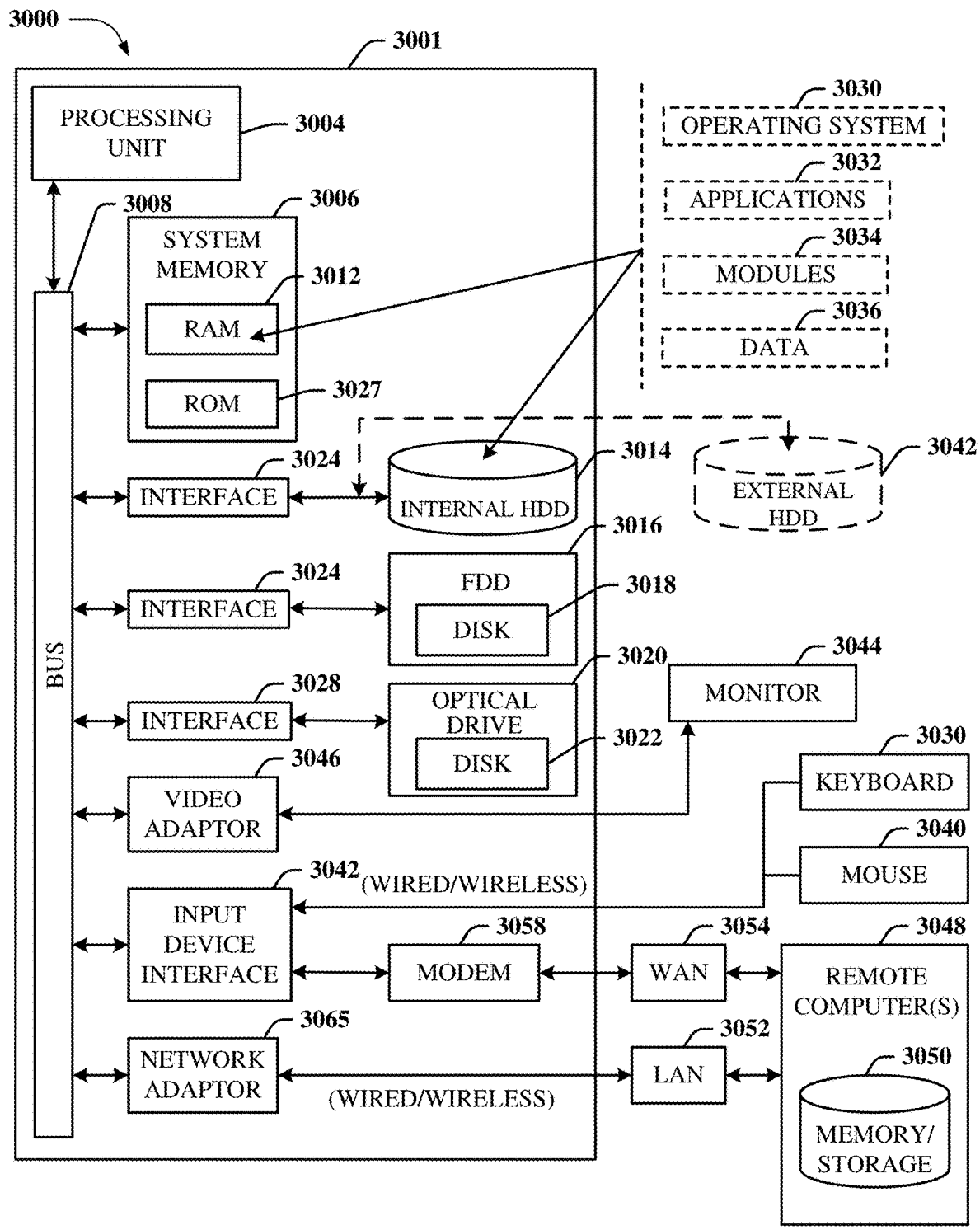
FIG. 30 illustrates an example block diagram of an example computer operable to engage in a system architecture that facilitates secure wireless communication according to one or more embodiments described herein.

Referring now to FIG. 30, there is illustrated a block diagram of a computer 3000 operable to execute a system architecture that facilitates establishing a transaction between an entity and a third party. The computer 3000 can provide networking and communication capabilities between a wired or wireless communication network and a server (e.g., Microsoft server) and/or communication device. In order to provide additional context for various aspects thereof, FIG. 30 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 30, implementing various aspects described herein with regards to the end-user device can include a computer 3000, the computer 3000 including a processing unit 3004, a system memory 3006 and a system bus 3008. The system bus 3008 couples system components including, but not limited to, the system memory 3006 to the processing unit 3004. The processing unit 3004 can be any of various commercially available processors. Dual microprocessors and other multi-processor architectures can also be employed as the processing unit 3004.

The system bus 3008 can be any of several types of bus structure that can further interconnect to a memory bus (with or without a memory controller), a peripheral bus, and a local bus using any of a variety of commercially available bus architectures. The system memory 3006 includes read-only memory (ROM) 3027 and random access memory (RAM) 3012. A basic input/output system (BIOS) is stored in a non-volatile memory 3027 such as ROM, EPROM, EEPROM, which BIOS contains the basic routines that help to transfer information between elements within the computer 3000, such as during start-up. The RAM 3012 can also include a high-speed RAM such as static RAM for caching data.

The computer 3000 further includes an internal hard disk drive (HDD) 3014 (e.g., EIDE, SATA), which internal hard disk drive 3014 can also be configured for external use in a suitable chassis (not shown), a magnetic floppy disk drive (FDD) 3016, (e.g., to read from or write to a removable diskette 3018) and an optical disk drive 3020, (e.g., reading a CD-ROM disk 3022 or, to read from or write to other high capacity optical media such as the DVD). The hard disk drive 3014, magnetic disk drive 3016 and optical disk drive 3020 can be connected to the system bus 3008 by a hard disk drive interface 3024, a magnetic disk drive interface 3026 and an optical drive interface 3028, respectively. The interface 3024 for external drive implementations includes at least one or both of Universal Serial Bus (USB) and IEEE 3094 interface technologies. Other external drive connection technologies are within contemplation of the subject innovation.

The drives and their associated computer-readable media provide nonvolatile storage of data, data structures, computer-executable instructions, and so forth. For the computer 3000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 3000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 3012, including an operating system 3030, one or more application programs 3032, other program modules 3034 and program data 3036. All or portions of the operating system, applications, modules, and/or data can also be cached in the RAM 3012. It is to be appreciated that the innovation can be implemented with various commercially available operating systems or combinations of operating systems.

A user can enter commands and information into the computer 3000 through one or more wired/wireless input devices, e.g., a keyboard 3038 and a pointing device, such as a mouse 3040. Other input devices (not shown) may include a microphone, an IR remote control, a joystick, a game pad, a stylus pen, touch screen, or the like. These and other input devices are often connected to the processing unit 3004 through an input device interface 3042 that is coupled to the system bus 3008, but can be connected by other interfaces, such as a parallel port, an IEEE 2394 serial port, a game port, a USB port, an IR interface, etc.

A monitor 3044 or other type of display device is also connected to the system bus 3008 via an interface, e.g., a video adapter 3046. Also, computer 3000 can optionally include other peripheral output devices (not shown), such as speakers, printers, etc.

The computer 3000 can operate in a networked environment using logical connections by wired and/or wireless communications to one or more remote computers, such as a remote computer(s) 3048. The remote computer(s) 3048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 3050 is illustrated. The logical connections depicted include wired/wireless connectivity to a local area network (LAN) 3052 and/or larger networks, e.g., a wide area network (WAN) 3054. Such LAN and WAN networking environments are commonplace in offices and companies, and facilitate enterprise-wide computer networks, such as intranets, all of which may connect to a global communications network, e.g., the Internet.

When used in a LAN networking environment, the computer 3000 is connected to the local network 3052 through a wired and/or wireless communication network interface or adapter 3056. The adapter 3056 may facilitate wired or wireless communication to the LAN 3052, which may also include a wireless access point disposed thereon for communicating with the wireless adapter 3056.

When used in a WAN networking environment, the computer 3000 can include a modem 3058, or is connected to a communications server on the WAN 3054, or has other means for establishing communications over the WAN 3054, such as by way of the Internet. The modem 3058, which can be internal or external and a wired or wireless device, is connected to the system bus 3008 through the input device interface 3042. In a networked environment, program modules depicted relative to the computer, or portions thereof, can be stored in the remote memory/storage device 3050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   identifying, by network equipment comprising a processor, a first access point device satisfying a first interference criterion;
   identifying, by the network equipment, a second access point device operating on a same frequency as the first access point device, and satisfying a distance criterion and a second interference criterion;
   pairing, by the network equipment, the first access point device with the second access point device as a problematic access point device pair; and
   in response to determining that the first access point device is controllable by the network equipment and supports automatic channel scan and selection, sending, by the network equipment, a request to the first access point device to perform the automatic channel scan and selection.

2. The method of claim 1, further comprising, in response to determining that the first access point device is controllable by the network equipment and does not support the automatic channel scan and selection, determining, by the network equipment, whether the second access point device is controllable by the network equipment and supports the automatic channel scan and selection.

3. The method of claim 2, wherein the request is first request, and further comprising, in response to determining that the second access point device is controllable by the network equipment and supports the automatic channel scan and selection, sending, by the network equipment, a second request to the second access point device to perform the automatic channel scan and selection.

4. The method of claim 1, further comprising, in response to determining that the first access point device is controllable by the network equipment and does not support the automatic channel scan and selection, and the second access point device is controllable by the network equipment and does not support the automatic channel scan and selection, determining, by the network equipment, respective minimum reuse distances from the first access point device for a group of channels.

5. The method of claim 4, wherein the request is first request, and further comprising sending, by the network equipment, a second request to the first access point device to select a channel, from the group of channels, that has a largest minimum reuse distance of the respective minimum reuse distances.

6. The method of claim 1, wherein the first interference criterion is associated with jitter.

7. The method of claim 1, wherein the first interference criterion is associated with a threshold amount of interference.

8. Network equipment, comprising:
   a processor; and
   a memory that stores executable instructions that, when executed by the processor, facilitate performance of operations, comprising:
      determining a first access point device that satisfies a first service threshold criterion;
      determining a second access point device operating on a same or substantially same frequency as the first access point device, and that satisfies a distance criterion and a second service threshold criterion; and
      categorizing the first access point device with the second access point device as a problematic access point device pair; and
      in response to determining that the first access point device is controllable by the network equipment and does not support automatic channel scan and selection, or in response to determining that the first access point device is not controllable by the network equipment, determining whether the second access point device is controllable by the network equipment and supports the automatic channel scan and selection.

9. The network equipment of claim 8, wherein the operations further comprise, in response to determining that the first access point device is controllable by the network equipment and supports the automatic channel scan and selection, sending an instruction to the first access point device to perform a channel scan and selection.

10. The network equipment of claim 8, wherein the operations further comprise, in response to determining that the second access point device is controllable by the network equipment and supports the automatic channel scan and selection, sending an instruction to the second access point device to perform a channel scan and selection.

11. The network equipment of claim 8, wherein the operations further comprise, in response to determining that the first access point device is controllable by the network equipment and does not support the automatic channel scan and selection, and the second access point device is controllable by the network equipment and does not support the automatic channel scan and selection, or the first access point device and the second access point device are not controllable by the network equipment, determining respective minimum reuse distances from the first access point device for available channels.

12. The network equipment of claim 11, wherein the operations further comprise, based on the respective minimum reuse distances, sending an instruction to the first access point device to tune to a channel, from the available channels, that satisfies a minimum reuse distance criterion.

13. The network equipment of claim 8, wherein the first service threshold criterion is associated with a threshold amount of interference.

14. The network equipment of claim 8, wherein the first service threshold criterion is associated with jitter.

15. A non-transitory machine-readable medium, comprising executable instructions that, when executed by a processor of a server device, facilitate performance of operations, comprising:
   determining a first access point device that meets a first communication quality criterion;
   determining a second access point device operating using a same frequency band as the first access point device, and that meets a distance criterion and a second communication quality criterion; and
   identifying the first access point device with the second access point device as a problematic access point device pair; and
   in response to determining that the first access point device is controllable by the server device and supports automatic channel scan and selection, sending a command to the first access point device to perform a channel scan and selection.

16. The non-transitory machine-readable medium of claim 15, wherein the operations further comprise, in response to determining that the first access point device is controllable by the server device and does not support the automatic channel scan and selection, or the first access point device is not controllable by the server device, determining whether the second access point device is controllable by the server device and supports the automatic channel scan and selection.

17. The non-transitory machine-readable medium of claim 16, wherein the command is first request, and the operations further comprise, in response to determining that the second access point device is controllable by the server device and supports the automatic channel scan and selection, sending a second command to the second access point device to perform a channel scan and selection.

18. The non-transitory machine-readable medium of claim 15, wherein the operations further comprise, in response to determining that the first access point device is controllable by the server device and does not support the automatic channel scan and selection, and the second access point device is controllable by the server device and does not support the automatic channel scan and selection, or the first access point device and the second access point device are not controllable by the server device, determining respective minimum reuse distances from the first access point device for a group of channels.

19. The non-transitory machine-readable medium of claim 18, wherein the command is first request, and the operations further comprise sending a second command to the first access point device to the choose a channel, from the group of channels and based on the respective minimum reuse distances, that satisfies a minimum reuse distance criterion.

20. The non-transitory machine-readable medium of claim 15, wherein the first communication quality criterion is associated with jitter.

* * * * *